US009467834B2

(12) United States Patent
Guday et al.

(10) Patent No.: US 9,467,834 B2
(45) Date of Patent: Oct. 11, 2016

(54) MOBILE DEVICE EMERGENCY SERVICE

(71) Applicant: Microsoft Technology Licensing, LLC, Redmond, WA (US)

(72) Inventors: Shai Guday, Redmond, WA (US); Joseph H. Matthews, III, Woodinville, WA (US); Joseph A. Schrader, Kirkland, WA (US); Ted Tai-Yu Chen, Seattle, WA (US); Raman K. Sarin, Redmond, WA (US); Sharad Agarwal, Seattle, WA (US); Shawn M. Thomas, Redmond, WA (US); John D. Skovorn, Bellevue, WA (US); John A. Yovin, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 13/726,049

(22) Filed: Dec. 22, 2012

(65) Prior Publication Data
US 2013/0295872 A1 Nov. 7, 2013

Related U.S. Application Data

(60) Provisional application No. 61/580,131, filed on Dec. 23, 2011, provisional application No. 61/580,137, filed on Dec. 23, 2011, provisional application No. 61/580,143, filed on Dec. 23, 2011.

(51) Int. Cl.
*H04M 1/66* (2006.01)
*H04W 24/00* (2009.01)
(Continued)

(52) U.S. Cl.
CPC ............... *H04W 4/22* (2013.01); *H04W 4/046* (2013.01)

(58) Field of Classification Search
CPC ............................... H04M 1/274533
USPC ............................... 455/411, 456.1
See application file for complete search history.

(56) References Cited

U.S. PATENT DOCUMENTS 5,883,598 A 3/1999 Parl et al.
6,286,001 B1 9/2001 Walker et al.
(Continued)

FOREIGN PATENT DOCUMENTS

CN 1984402 6/2007
CN 101112072 1/2008
(Continued)

OTHER PUBLICATIONS

"Welcome to Sprint Drive First", Retrieved at <<https://drivefirst.sprint.com/welcome.htm>> on Nov. 20, 2013, 2 pages.
(Continued)

*Primary Examiner* — Joshua Schwartz
(74) *Attorney, Agent, or Firm* — Miia Sula; Judy Yee; Micky Minhas

(57) ABSTRACT

Mobile device emergency service techniques are described. In embodiments, a client device includes one or more modules implemented at least partially in hardware and configured to implement an emergency service. The emergency service configured to support operations including generating a user interface for display on a display device, receiving one or more inputs usable to form an emergency contacts list that includes a plurality of emergency contacts, and causing the emergency contacts list to be communicated to one or more other client devices for use in generating a message to be communicated automatically and without user intervention to the emergency contacts in the emergency contacts list responsive to a trigger.

17 Claims, 11 Drawing Sheets

(51) Int. Cl.
*H04W 4/22* (2009.01)
*H04W 4/04* (2009.01)

(56) References Cited

U.S. PATENT DOCUMENTS

| | | |
|---|---|---|
| 6,339,826 B2 | 1/2002 | Hayes et al. |
| 6,405,033 B1 | 6/2002 | Kennedy et al. |
| 6,446,069 B1 | 9/2002 | Yaung et al. |
| 6,504,480 B1 | 1/2003 | Magnuson et al. |
| 6,546,002 B1 | 4/2003 | Kim |
| 6,549,768 B1 | 4/2003 | Fraccaroli |
| 6,564,149 B2 | 5/2003 | Lai |
| 6,650,189 B1 | 11/2003 | Romao |
| 6,662,023 B1 | 12/2003 | Helle |
| 6,678,508 B1 | 1/2004 | Koilpillai et al. |
| 6,799,047 B1 | 9/2004 | Bahl et al. |
| 6,847,892 B2 | 1/2005 | Zhou |
| 6,920,455 B1 | 7/2005 | Weschler |
| 6,941,134 B2 | 9/2005 | White |
| 7,058,659 B2 | 6/2006 | Ryu |
| 7,076,797 B2 | 7/2006 | Loveland |
| 7,096,030 B2 | 8/2006 | Huomo |
| 7,142,848 B2 | 11/2006 | Owen et al. |
| 7,161,914 B2 | 1/2007 | Shoaib et al. |
| 7,171,557 B2 | 1/2007 | Kallahalla et al. |
| 7,212,613 B2 | 5/2007 | Kim et al. |
| 7,222,360 B1 | 5/2007 | Miller |
| 7,272,388 B2 | 9/2007 | Andrew et al. |
| 7,274,925 B2 | 9/2007 | Chaar et al. |
| 7,302,272 B2 | 11/2007 | Ackley |
| 7,305,284 B2 | 12/2007 | Teshima et al. |
| 7,308,255 B2 | 12/2007 | Loveland |
| 7,321,774 B1 | 1/2008 | Lau et al. |
| 7,346,921 B2 | 3/2008 | Murren et al. |
| 7,359,713 B1 | 4/2008 | Tiwari |
| 7,366,798 B2 | 4/2008 | Nordstrom et al. |
| 7,408,506 B2 | 8/2008 | Miller |
| 7,471,929 B2 | 12/2008 | Fujioka |
| 7,530,099 B2 | 5/2009 | Flurry et al. |
| 7,634,455 B1 | 12/2009 | Keene et al. |
| 7,657,849 B2 | 2/2010 | Chaudhri et al. |
| 7,668,830 B2 | 2/2010 | Hakala |
| 7,680,882 B2 | 3/2010 | Tiu, Jr. et al. |
| 7,714,778 B2 | 5/2010 | Dupray |
| 7,796,944 B2 | 9/2010 | Eaton et al. |
| 7,809,350 B2 | 10/2010 | Buckley et al. |
| 7,869,792 B1 | 1/2011 | Zhou et al. |
| 7,898,428 B2 | 3/2011 | Dietz et al. |
| 7,958,562 B2 | 6/2011 | Gaucas |
| 7,961,651 B2 | 6/2011 | Kim et al. |
| 8,046,839 B2 | 10/2011 | Lo |
| 8,244,272 B2 | 8/2012 | Morgan et al. |
| 8,275,352 B2 | 9/2012 | Forstall et al. |
| 8,311,730 B2 | 11/2012 | Neff |
| 8,331,899 B2 | 12/2012 | Broms |
| 8,385,039 B2 | 2/2013 | Rothkopf |
| 8,437,779 B2 | 5/2013 | Phukan |
| 8,549,657 B2 | 10/2013 | Karlson et al. |
| 8,565,820 B2 | 10/2013 | Riemer et al. |
| 8,657,743 B2 | 2/2014 | Rietzel et al. |
| 8,706,172 B2 | 4/2014 | Priyantha et al. |
| 8,874,162 B2 | 10/2014 | Schrader et al. |
| 8,907,772 B1 | 12/2014 | Green et al. |
| 8,918,119 B2 | 12/2014 | Kim et al. |
| 9,027,117 B2 | 5/2015 | Wilairat |
| 9,066,234 B2 | 6/2015 | Karlson et al. |
| 2001/0005681 A1 | 6/2001 | Kim |
| 2001/0039587 A1 | 11/2001 | Uhler et al. |
| 2002/0044149 A1 | 4/2002 | McCarthy et al. |
| 2003/0003907 A1 | 1/2003 | Lai et al. |
| 2003/0139192 A1 | 7/2003 | Chmaytelli et al. |
| 2003/0187803 A1 | 10/2003 | Pitt |
| 2004/0007916 A1 | 1/2004 | Awada et al. |
| 2004/0015940 A1 | 1/2004 | Heisey et al. |
| 2004/0039909 A1 | 2/2004 | Cheng |
| 2004/0166878 A1 | 8/2004 | Erskine et al. |
| 2004/0192352 A1 | 9/2004 | Vallstrom et al. |
| 2004/0203576 A1 | 10/2004 | Droste et al. |
| 2000/5012640 | 1/2005 | Kong, Qin et al. |
| 2005/0037775 A1 | 2/2005 | Moeglein et al. |
| 2005/0055567 A1 | 3/2005 | Libin et al. |
| 2005/0059418 A1 | 3/2005 | Northcutt |
| 2005/0070276 A1 | 3/2005 | McGarry |
| 2005/0107114 A1 | 5/2005 | Ocock et al. |
| 2005/0138110 A1 | 6/2005 | Redlich et al. |
| 2005/0143171 A1 | 6/2005 | Loose |
| 2005/0210104 A1 | 9/2005 | Torvinen |
| 2006/0046706 A1 | 3/2006 | Lin et al. |
| 2006/0053389 A1 | 3/2006 | Michelman |
| 2006/0099969 A1 | 5/2006 | Staton et al. |
| 2006/0136998 A1 | 6/2006 | Oowaki et al. |
| 2006/0246872 A1 | 11/2006 | Tarkkala |
| 2006/0253570 A1 | 11/2006 | Biswas et al. |
| 2006/0256005 A1 | 11/2006 | Thandu et al. |
| 2006/0271797 A1 | 11/2006 | Ginggen et al. |
| 2006/0293057 A1 | 12/2006 | Mazerski et al. |
| 2007/0006327 A1 | 1/2007 | Lal et al. |
| 2007/0028176 A1 | 2/2007 | Perdomo et al. |
| 2007/0032225 A1 | 2/2007 | Konicek et al. |
| 2007/0042790 A1 | 2/2007 | Mohi et al. |
| 2007/0046423 A1 | 3/2007 | Baucom |
| 2007/0046456 A1* | 3/2007 | Edwards et al. ............ 340/539.1 |
| 2007/0064882 A1* | 3/2007 | Ger et al. ......................... 379/33 |
| 2007/0067655 A1 | 3/2007 | Shuster |
| 2007/0072616 A1 | 3/2007 | Irani |
| 2007/0082707 A1 | 4/2007 | Flynt et al. |
| 2007/0091037 A1 | 4/2007 | Lee |
| 2007/0111726 A1 | 5/2007 | Lambert et al. |
| 2007/0150826 A1 | 6/2007 | Anzures et al. |
| 2007/0150842 A1 | 6/2007 | Chaudhri et al. |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0300140 A1 | 12/2007 | Makela et al. |
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0051079 A1 | 2/2008 | Forsgren |
| 2008/0080688 A1 | 4/2008 | Burgan et al. |
| 2008/0082693 A1 | 4/2008 | Meijer et al. |
| 2008/0096518 A1 | 4/2008 | Mock et al. |
| 2008/0101658 A1 | 5/2008 | Ahern et al. |
| 2008/0111698 A1 | 5/2008 | Atherton |
| 2008/0154780 A1 | 6/2008 | Soukup et al. |
| 2008/0254767 A1 | 10/2008 | Jin |
| 2008/0268870 A1 | 10/2008 | Houri |
| 2008/0305808 A1 | 12/2008 | Chan et al. |
| 2008/0318595 A1 | 12/2008 | Rofougaran |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0201896 A1 | 8/2009 | Davis et al. |
| 2009/0205041 A1* | 8/2009 | Michalske ....................... 726/17 |
| 2009/0224931 A1 | 9/2009 | Dietz et al. |
| 2009/0265794 A1 | 10/2009 | Apelqvist |
| 2009/0278738 A1 | 11/2009 | Gopinath |
| 2009/0282473 A1 | 11/2009 | Karlson et al. |
| 2010/0001967 A1 | 1/2010 | Yoo |
| 2010/0020035 A1 | 1/2010 | Ryu et al. |
| 2010/0056124 A1 | 3/2010 | Keating et al. |
| 2010/0066821 A1 | 3/2010 | Rosener et al. |
| 2010/0074450 A1 | 3/2010 | Liao |
| 2010/0115610 A1 | 5/2010 | Tredoux et al. |
| 2010/0127836 A1 | 5/2010 | Huang et al. |

(56) References Cited

U.S. PATENT DOCUMENTS

| | | |
|---|---|---|
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1* | 7/2010 | Scott et al. ............... 455/414.1 |
| 2010/0210301 A1 | 8/2010 | Dietz et al. |
| 2010/0216509 A1 | 8/2010 | Riemer et al. |
| 2010/0227588 A1 | 9/2010 | Bradley |
| 2010/0253503 A1 | 10/2010 | Juang |
| 2010/0255856 A1 | 10/2010 | Kansal et al. |
| 2010/0268779 A1 | 10/2010 | Rao |
| 2010/0285815 A1 | 11/2010 | Treu et al. |
| 2010/0302028 A1 | 12/2010 | Desai et al. |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0324819 A1 | 12/2010 | Nurminen et al. |
| 2011/0010340 A1 | 1/2011 | Hung et al. |
| 2011/0021213 A1 | 1/2011 | Carr |
| 2011/0021234 A1 | 1/2011 | Tibbitts et al. |
| 2011/0047484 A1 | 2/2011 | Mount et al. |
| 2011/0063098 A1 | 3/2011 | Fischer et al. |
| 2011/0065419 A1 | 3/2011 | Book et al. |
| 2011/0070829 A1 | 3/2011 | Griffin et al. |
| 2011/0093161 A1 | 4/2011 | Zhou et al. |
| 2011/0111728 A1 | 5/2011 | Ferguson et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0299422 A1 | 12/2011 | Kim et al. |
| 2011/0307166 A1 | 12/2011 | Hiestermann et al. |
| 2011/0319051 A1 | 12/2011 | Reitnour |
| 2011/0319094 A1 | 12/2011 | Usui et al. |
| 2012/0023573 A1 | 1/2012 | Shi |
| 2012/0046020 A1 | 2/2012 | Tomasini |
| 2012/0084691 A1 | 4/2012 | Yun |
| 2012/0084734 A1 | 4/2012 | Wilairat |
| 2012/0084737 A1 | 4/2012 | Gimpl et al. |
| 2012/0098768 A1 | 4/2012 | Bendewald et al. |
| 2012/0100895 A1 | 4/2012 | Priyantha et al. |
| 2012/0115512 A1 | 5/2012 | Grainger et al. |
| 2012/0144468 A1 | 6/2012 | Pratt et al. |
| 2012/0166548 A1* | 6/2012 | Gropper ............... G06Q 30/02 709/205 |
| 2012/0234058 A1 | 9/2012 | Neil et al. |
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0268249 A1 | 10/2012 | Kansal et al. |
| 2012/0282887 A1* | 11/2012 | Khoo et al. ............... 455/404.2 |
| 2012/0289217 A1 | 11/2012 | Riemer et al. |
| 2012/0306637 A1 | 12/2012 | McGough et al. |
| 2012/0317162 A1 | 12/2012 | Endsley et al. |
| 2013/0006469 A1 | 1/2013 | Green et al. |
| 2013/0023246 A9 | 1/2013 | Ellingham et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040711 A1 | 2/2013 | Kim et al. |
| 2013/0072172 A1 | 3/2013 | Chang et al. |
| 2013/0084847 A1 | 4/2013 | Tibbitts et al. |
| 2013/0130742 A1 | 5/2013 | Dietz et al. |
| 2013/0188503 A1 | 7/2013 | Anepu et al. |
| 2013/0225151 A1 | 8/2013 | King |
| 2013/0225152 A1 | 8/2013 | Matthews |
| 2013/0227431 A1 | 8/2013 | Vasudevan |
| 2013/0295913 A1 | 11/2013 | Matthews |
| 2013/0298037 A1 | 11/2013 | Matthews |
| 2013/0303143 A1 | 11/2013 | Schrader |
| 2013/0305319 A1 | 11/2013 | Matthews |
| 2013/0305354 A1 | 11/2013 | King et al. |
| 2014/0068755 A1 | 3/2014 | King et al. |
| 2015/0011203 A1 | 1/2015 | Schrader et al. |
| 2015/0220712 A1 | 8/2015 | King et al. |

FOREIGN PATENT DOCUMENTS

| | | |
|---|---|---|
| CN | 101778165 | 7/2010 |
| CN | 101828162 | 9/2010 |
| EP | 2169946 | 3/2010 |
| EP | 2293016 | 3/2011 |
| EP | 2369864 | 9/2011 |
| EP | 2469442 | 6/2012 |
| JP | 07203015 | 8/1995 |
| JP | 2002142010 | 5/2002 |
| JP | 2002530783 | 9/2002 |
| JP | 2003032353 | 1/2003 |
| JP | 2007257140 | 10/2007 |
| JP | 2009521753 | 6/2009 |
| JP | 2010503082 | 1/2010 |
| KR | 20050037613 | 4/2005 |
| KR | 20100083396 | 7/2010 |
| KR | 20110093528 | 8/2011 |
| WO | WO-2005031544 | 4/2005 |
| WO | WO-2006088273 | 8/2006 |
| WO | WO-2006099535 | 9/2006 |
| WO | WO-2007130123 | 11/2007 |
| WO | WO-2009105666 | 8/2009 |
| WO | WO-2011135359 | 11/2011 |
| WO | WO-2012047412 | 4/2012 |
| WO | WO-2013061156 | 5/2013 |

OTHER PUBLICATIONS

Samberg, David "Stay Focused While Driving", Retrieved from <<http://www.verizonwireless.com/news/2012/09/safely-do-driving-app.html>> on Nov. 20, 2013, (Sep. 13, 2012), 5 pages.

"BroadCloud FamilyCenter", *BroadSoft Data Sheet*, retrieved from <http://www.broadsoft.com/pdf/datasheet-broadcloud-familycenter.pdf> on Dec. 13, 2011, 1 page.

"Distracted Driving Information Clearinghouse", Retrieved from <http://www.fcc.gov/encyclopedia/distracted-driving-information-clearinghouse>, (Jul. 27, 2011), 4 pages.

"iCloud: What You Need", MacWorld.com, retrieved from <http://www.macworld.com/article/160380/2011/06/icloud_what_you_need_to_know.html> on Dec. 13, 2011,(Jun. 8, 2011),16 pages.

"Parental Control Software for Cell Phones", retrieved from <http://www.parentalcontrolcellphones.com/> on Dec. 8, 2011,(Apr. 30, 2010), 5 pages.

"Safe Driving System", Retrieved from <http://web.archive.org/web/20100512220953/http://key2safedriving.com/>, (May 12, 2010), 2 pages.

"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011,(Jan. 7, 2010), 2 pages.

Bilderbeek, Pim "From Unified to Social Communications and Collaboration", retrieved from <http://www.themetisfiles.com/2011/10/from-unified-to-social-communications-and-collaboration/> on Dec. 13, 2011,(Oct. 25, 2011), 4 pages.

Davies, Chris "T-Mobile UK to Offer ICD Vega 15-inch Tegra Android Tablet in 2010", Retrieved from <http://www.

(56) References Cited

OTHER PUBLICATIONS slashgearcom/t-mobile-uk-to-offer-icd-vega-15-inch-tegra-android-tablet-in-2010-0768671/> on Mar. 11, 2013, (Jan. 7, 2010), 7 pages.

Dipane, Jared "Sprint to Bring Parental Locks to Android Phones to Prevent Use While Driving", retrieved from <http://www.androidcentral.com/sprint-bring-parental-locks-android-phones-prevent-use-while-driving> on Dec. 8, 2011,(Mar. 22, 2011), 7 pages.

Kharif, Olga "Parental Controls for Mobile Phones? You Bet", *Tech Beat*, retrieved from <http://www.businessweek.com/the_thread/techbeat/archives/2005/08/parental_contro.html> on Dec. 8, 2011,(Aug. 16, 2005),12 pages.

Leblanc, Brandon "The Device Experience in Windows 7—Updated", *Windows 7 Team Blog*, retrieved from <http://windowsteamblog.com/windows/archive/b/windows7/archive/2009/09/01/the-device-experience-in-windows-7-updated.aspx> on Dec. 13, 2011,(Sep. 1, 2009),14 pages.

Mui, Chunka "The Lifesaving Smartphone Feature That We Need: Driving Mode", Retrieved from <http://www.forbes.com/sites/chunkamui/2011/12/19/the-smart-phone-feature-that-we-need-driving-mode/>, (Dec. 19, 2011), 4 pages.

Nasar, Jack et al., "Mobile Telephones, Distracted Attention, and Pedestrian Safety", *Accident Analysis & Prevention*, retrieved from <http://facweb.knowlton.ohiostate.edu/jnasar/crpinfo/research/MobilePhones_AAP_2007.pdf> on Dec. 8, 2011,(Jan. 2008), pp. 69-75.

Patten, Christopher et al., "Using Mobile Telephones: Cognitive Workload and Attention Resource Allocation", *Accident Analysis and Prevention*, retrieved from <http://beta.nsc.org/safety_road/Distracted_Driving/Documents/Using%20mobile%20telephones,%20cognitive%20workload%20and%20attention%20resource%20allocation.pdf> on Dec. 8, 2011,(May 2004), pp. 341-350.

Saenz, Aaron "Unlock Your Door with Your Phone, Text a Key to a Friend—Lockitron is Awesome (video)", Retrieved from: <http://singularityhub.com/2011/05/24/unlock-your-door-with-your-phone-text-a-key-to-a-friend-lockitron-is-awesome-video/> on Feb. 10, 2012,(May 24, 2011), 4 pages.

Tiemann, Amy "AT&T Adds Parental Control Options to Cell Phones", *CNET News*, retrieved from <http://news.cnet.com/8301-13507_3-9770506-18.html> on Dec. 8, 2011,(Sep. 7, 2007), 1 pages.

Warren, Tom "Microsoft Flaunts Metro Style PowerPoint Live Tiles", *WinRumors*, retrieved from <http://www.winrumors.com/microsoft-flaunts-metro-style-powerpoint-live-tiles-video/> on Dec. 13, 2011,(Jul. 11, 2011),12 pages.

Williams, Harold "AT&T Drive Mode, The Anti-Texting While Driving Mobile Solution (video)", Retrieved from <http://www.talkandroid.com/66579-att-drive-mode-the-anti-texting-while-driving-mobile-solution-video/>, (Oct. 13, 2011), 6 pages.

Wood, Molly "Hey, Phone Makers: Where's 'Driving Mode'?", Retrieved from <http://news.cnet.com/8301-31322_3-20003824-256.html>, (Apr. 29, 2010), 3 pages.

"EP Search Report", EP Application No. 09747072.8, Jan. 17, 2003, 5 Pages.

"Final Office Action", U.S. Appl. No. 12/194,213, Sep. 20, 2011, 11 Pages.

"Final Office Action", U.S. Appl. No. 12/417,752, Jul. 17, 2013, 18 pages.

"Final Office Action", U.S. Appl. No. 12/417,752, Sep. 13, 2012, 18 pages.

"Final Office Action", U.S. Appl. No. 12/912,456, Jan. 9, 2013, 21 pages.

"Final Office Action", U.S. Appl. No. 12/912,456, Sep. 6, 2013, 22 pages.

"Final Office Action", U.S. Appl. No. 13/090,474, Nov. 21, 2013, 12 pages.

"Foreign Office Action", CN Application No. 200980128048.8, May 6, 2013, 7 Pages.

"Foreign Office Action", CN Application No. 200980128048.8, Dec. 19, 2012, 11 Pages.

"Ignite Where & Launch Pad", O'Reilly, Where 2.0 Conference 2008, retrieved from <http://en.oreilly.com/where2008/public/schedule/detail/2572> on Feb. 5, 2009,May 2008, 4 pages.

"International Search Report and Written Opinion", Application No. PCT/US2013/050963, Nov. 8, 2013, 14 pages.

"International Search Report and Written Opinion", Application No. PCT/US2009/039509, Nov. 18, 2009, 8 Pages.

"International Search Report and Written Opinion", Application No. PCT/US2012/071557, Mar. 28, 2013, 9 pages.

"International Search Report and Written Opinion", Application No. PCT/US2012/071562, Apr. 24, 2013, 9 pages.

"International Search Report and Written Opinion", Application No. PCT/US2012/034598, Oct. 12, 2012, 9 pages.

"iPad Parental Control (restricting app access)", iPad Reviews, Jailbreak Guides; last retrieved from http://ipaded.net/ipad/parental-control/ on Feb. 29, 2012, 5 pages.

"No Tech Panacea for Tech-Distracted Driving", http://mobile.slashdot.org/story/12/06/11/0556231/no-tech-panacea-for . . . , Dec. 6, 2011, 30 Pages.

"Non Final Office Action", U.S. Appl. No. 12/417,752, Jun. 28, 2011, 14 pages.

"Non Final Office Action", U.S. Appl. No. 13/222,538, Feb. 14, 2013, 33 Pages.

"Non-Final Office Action", U.S. Appl. No. 12/194,213, Mar. 17, 2011, 11 Pages.

"Non-Final Office Action", U.S. Appl. No. 12/417,752, Feb. 25, 2014, 22 pages.

"Non-Final Office Action", U.S. Appl. No. 12/417,752, Oct. 29, 2013, 16 Pages.

"Non-Final Office Action", U.S. Appl. No. 12/417,752, May 24, 2013, 17 pages.

"Non-Final Office Action", U.S. Appl. No. 12/912,456, May 4, 2012, 14 pages.

"Non-Final Office Action", U.S. Appl. No. 12/912,456, May 29, 2013, 20 pages.

"Non-Final Office Action", U.S. Appl. No. 12/912,456, Sep. 11, 2012, 15 pages.

"Non-Final Office Action", U.S. Appl. No. 13/090,474, Apr. 26, 2013, 11 pages.

"Non-Final Office Action", U.S. Appl. No. 13/726,099, Mar. 18, 2014, 8 pages.

"Notice of Allowance", U.S. Appl. No. 12/194,213, May 31, 2013, 11 Pages.

"Notice of Allowance", U.S. Appl. No. 12/194,213, Jun. 27, 2012, 16 Pages.

"Notice of Allowance", U.S. Appl. No. 12/194,213, Dec. 21, 2012, 13 Pages.

"Notice of Allowance", U.S. Appl. No. 12/912,456, Jan. 7, 2014, 9 Pages.

"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.

"Restriction Requirement", U.S. Appl. No. 13/726,097, Mar. 21, 2014, 7 pages.

"Setting Up Simple Restricted Access", Retrieved at: http://support.webvanta.com/support_article/615777-setting-up-simple-restricted-access-on Feb. 29, 2012, 3 Pages.

"What's an Android? and Other Smart(phone) Questions", Retrieved from: <http://bestbuybusinessdistrict.com/knowlege-center/58-what%27s-an-android-and-other-smart-phone-questions> on Feb. 7, 2011, Sep. 6, 2010, 4 pages.

Aalto, et al., "Bluetooth and WAP Push Based Location-Aware Mobile Advertising System", ACM, MobiSYS '04, Jun. 6-9, 2004, Boston, MA, retrieved from <http://www.mediateam.oulu.fi/publications/pdf/496.pdf> on Feb. 5, 2009,Jun. 6, 2004, 10 pages.

Abdelzaher, et al., "Mobiscopes for Human Spaces", IEEE Pervasive Computing, vol. 6, No. 2, Apr. 2007, 11 pages.

Abdesslem, et al., "Less is More: Energy-Efficient Mobile Sensing with SenseLess", MobiHeld an ACM SIGCOMM workshop, Aug. 17, 2009, pp. 61-62.

(56) References Cited

OTHER PUBLICATIONS

Agarwal, et al., "Somniloquy: Augmenting Network Interfaces to Reduce PC Energy Usage", Symposium on Networked Systems Design and Implementation (NSDI), 2009, available at <http://www.usenix.org/events/nsdi09/tech/full_papers/agarwal/agarwal.pdf>,Apr. 23, 2009, pp. 365-380.
Aventail, et al., "Aventail and Trust Digital Launch Integrated Secure Mobile Access Solution", http://findarticles.com/p/articles/mi_pwwi/is_200602/ai_n16063742/?tag=content;col1, Last accessed May 14, 2008,Feb. 2006, 3 Pages.
Azizyan, et al., "SurroundSense: Mobile Phone Localization Using Ambient Sound and Light", retrieved from <http://synrg.ee.duke.edu/papers/surroundsense-poster.pdf> on Feb. 5, 2009, Sep. 22, 2008, 1 page.
Bahl, et al., "RADAR: An In-Building RF-based User Location and Tracking System", Microsoft Research, Proceedings of IEEE Infocom 2000, Tel-Aviv, Israel, retrieved from <https://3 research.microsoft.com/en-us/um/people/padmanab/papers/infocom2000.pdf> on Feb. 5, 2009,Mar. 2000, 10 pages.
Balakrishnan, et al., "ITR: Scalable Location-Aware Monitoring (SLAM) Systems", Laboratory for Computer Science & Department of EECS, MIT, Cambridge, MA, retrieved from <http://nms.lcs.mit.edu/projects/slam/prop.pdf> on Feb. 5, 2009,Nov. 9, 2001, 31 pages.
Barroso, et al., "The Case for Energy-Proportional Computing", IEEE Computer Society, vol. 40. No. 12, Dec. 2007, pp. 33-37.
Branscombe, "Kids Corner and Wallet", Retrieved from <http://www.techradar.com/reviews/pc-mac/software/operating-systems/windows-phone-8-1086692/review/6>, Jan. 25, 2012, 7 pages.
Burke, et al., "Participatory Sensing", WSW at SenSys, Oct. 31, 2006, 5 pages.
Campbell, et al., "Biometrically Enhanced Software-Defined Radios", Proc. Software Defined Radio Technical Conf, Orlando, Florida, Nov. 2003, 6 Pages.
Chiu, et al., "Playful Bottle: A Mobile Social Persuasion System to Motivate Healthy Water Intake", Proceedings of the 11th international conference on Ubiquitous computing, 2009, 10 pages.
Consolvo, "Flowers or a Robot Army?: Encouraging Awareness & Activity with Personal, Mobile Displays", Proceedings of the 10th International Conference on Ubiquitous Computing, vol. 12, No. 4, Publisher: ACM Press, Sep. 2008, 10 pages.
Constandache, et al., "Energy-Aware Localization Using Mobile Phones", retrieved from <http://www.cs.duke.edu/~ionut/2008_mobisys.pdf> on Feb. 5, 2009, Jun. 2008, 1 page.
Constandache, et al., "Energy-efficient Localization Via Personal Mobility Profiling", In Proceedings of MobiCASE 2009, Available at <http://synrg.ee.duke.edu/papers/mobicase09.pdf>,Oct. 2009, pp. 1-20.
Covington, et al., "Parameterized Authentication", Proc. 9th European Symposium on Research Computer Security, Lecture notes in Computer Science, Sep. 2004, 18 Pages.
"Extending Mobile Computer Battery Life through Energy-Aware Adaptation", School of Computer Science, Carnegie Mellon University, Pittsburgh, PA, retrieved from <http://reports-archive.adm.cs.cmu.edu/anon/2001/CMU-CS-01-171.pdf> from Feb. 5, 2009,Dec. 2001, 165 pages.
Foster, et al., "Precision and accuracy of an ankle-worn accelerometer-based pedometer in step counting and", Preventive Medicine, vol. 41, No. 3-4, Oct. 2005, pp. 778-783.
Gaonkar, et al., "Micro-Blog: Sharing and Querying Content through Mobile Phones and Social Participation", ACM, MobiSys 2008, Jun. 17-20, 2008, Breckenridge, CO, retrieved from <http://www.cs.duke.edu/~lpcox/romit-microblog.pdf> on Feb. 5, 2009,Jun. 17, 2008, 13 pages.
Hoffmann, et al., "Multilateral Security in Mobile Applications and Location Based Services", https://users.cs.jmu.edu/bernstdh/web/CS685/papers/hoffman-et-al-2002.pdf, Last accessed May 14, 2008,2002, 18 Pages.
Hoh, et al., "Virtual Trip Lines for Distributed Privacy-Preserving Traffic Monitoring", Proceedings of the 6th International Conference on Mobile Systems, Applications, and Services, Jun. 2008, 14 pages.
Hull, et al., "CarTel: A Distributed Mobile Sensor Computing System", Proceedings of the 4th international conference on Embedded networked sensor systems, Nov. 2006, 14 pages.
Jagadeesan, et al., "A Novel Approach to Design of User Re-Authentication Systems", Proc. 3rd IEEE Intl. Conf. on Biometrics: Theory, Applications and Systems, Sep. 2009, 6 Pages.
Kang, et al., "A Scalable and Energy-Efficient Context Monitoring Framework for Mobile Personal Sensor Networks", IEEE Transactions on Mobile Computing, vol. 9, No. 5, May 2010, pp. 686-702.
Kansal, et al., "Location and Mobility in a Sensor Network of Mobile Phones", Microsoft Research, Microsoft Corporation, retrieved from <http://research.microsoft.com/apps/pubs/default.aspx?id=70416> on Feb. 5, 2009,Jun. 4, 2007, 1 pages.
King, et al., "Mobile Device Child Share", U.S. Appl. No. 13/726,095, filed Mar. 21, 2013, 57 Pages.
Klosterman, et al., "Secure Continuous Biometric-Enhanced Authentication", Technical Report, May 2000, 25 Pages.
Kottahachchi, et al., "Access Controls for Intelligent Environments", In: Proceedings of ISDA '04: 4th Annual International Conference on Intelligent Systems Design and Applications. Budapest, Hungary (2004), 2004, 6 Pages.
Krumm et al., "Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009,Sep. 17, 2006, 18 pages.
Krumm, et al., "RightSPOT: A Novel Sense of Location for a Smart Personal Object", Proceedings of Ubicomp 2003, Seattle, WA, retrieved from <http://research.microsoft.com/en-us/um/people/horvitz/rightspot.htm> on Feb. 5, 2009,2003, 1 pages.
Lamarca, et al., "Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009,2005, 18 pages.
Lester, et al., "Validated Caloric Expenditure Estimation using a Single Body-Worn Sensor", Proceedings of the 11th international conference on Ubiquitous computing, Oct. 2009, 10 pages.
Lester, et al., "A Practical Approach to Recognizing Physical Activities", Pervasive Computing in Pervasive Computing, vol. 3968, 2006, 17 pages.
Liao, et al., "Extracting Places and Activities from GPS Traces Using Hierarchical Conditional Random Fields", The International Journal of Robotics Research, vol. 26, No. 1, 119-134, retrieved from <http://ijr.sagepub.com/cgi/content/26/1/119> on Feb. 5, 2009,2007, 20 pages.
Lin et al., "Enabling Energy-Efficient and Quality Localization Services", National Taiwan University, retrieved from <http://nslab.ee.ntu.edu.tw/publication/conf/qols-percom06.pdf> on Feb. 5, 2009,2006, 4 pages.
Lin, et al., "Energy-Accuracy Trade-off for Continuous Mobile Device Location", In Proceedings of ACM Mobisys 2010, Available at <http://research.microsoft.com/apps/pubs/default.aspx?id=120831>,Jun. 15, 2010, pp. 1-14.
Liu, et al., "xShare: Supporting Impromptu Sharing of Mobile Phones", In Proceedings of the 7th international conference on Mobile systems, applications, and services, Jun. 22, 2009, pp. 15-28.
Lu, et al., "Sound Sense: Scalable Sound Sensing for People-Centric Sensing Applications on Mobile Phones", Proceedings of the 7th international conference on Mobile systems, applications, and services, Jun. 2009, 14 pages.
McGlaun, "Fixes for Distracted Driving Remain Unclear", http://www.dailytech.com/article.aspx?newsid=24903, Jun. 12, 2012, 2 Pages.

(56) References Cited

OTHER PUBLICATIONS

Mohan, et al., "Nericell: Rich Monitoring of Road and Traffic Conditions using Mobile Smartphones", Proceedings of the 6th ACM conference on Embedded network sensor systems, Nov. 2008, 14 pages.

Oliver, et al., "Health Gear: A Real-Time Wearable System for Monitoring and Analyzing Physiological Signals", Apr. 2006, pp. 1-4.

Paek, et al., "Energy-Efficient Rate-Adaptive GPS-based Positioning for Smartphones", In Proceedings of MobiSys 2010, Available at <http://enl.usc.edu/papers/cache/Paek10a.pdf>,Jun. 2010, 16 pages.

Peng, et al., "BeepBeep: A High Accuracy Acoustic Ranging System Using Cots Mobile Devices", ACM, SenSys 2007, Nov. 6-9, 2007, Sydney, Australia, retrieved from <http://research.microsoft.com/en-us/groups/wn/sensys106-beepbeep.pdf> on Feb. 5, 2009,Nov. 6, 2007, 14 pages.

Pering, et al., "The PSI Board: Realizing a Phone-Centric Body Sensor Network", In 4th International Workshop on Wearable and Implantable Body Sensor Networks, 2007, 6 pages.

Person, "Writing Your Own GPS Applications: Part 2", The Code Project, retrieved from <http://www.codeproject.com/KB/mobile/WritingGPSApplications2.aspx> on Feb. 5, 2009,Dec. 20, 2004, 13 pages.

Quick, "BizzTrust for Android splits a single smartphone into two virtual phones", http://www.gizmag.com/bizztrust-for-android/20114/, Retrieved on Jan. 10, 2012,Oct. 2011, 4 Pages.

Riva, et al., "The Urbanet Revolution: Sensor Power to the People!", IEEE Pervasive Computing, vol. 6, No. 2, Apr. 2007, pp. 41-49.

Ruairi, et al., "An Energy-Efficient, Multi-Agent Sensor Network for Detecting Diffuse Events", IJCA1-07—retrieved from <http://www.aaai.org/Papers/IJCAI/2007/IJCA107-224.pdf> on Feb. 5, 2009, 2007, pp. 1390-1395.

Schindler, et al., "City-Scale Location Recognition", IEEE Computer Society Conference on Computer Vision and Pattern Recognition (CVPR), retrieved from <http://www.cc.gatech.edu/~phlosoft/files/schindler07cypr2.pdf> on Feb. 5, 2009,2007, 7 pages.

Shin, et al., "DEAMON: Energy-efficient sensor monitoring", 6th Annual IEEE Communications Society Conference on Sensor, Mesh and Ad Hoc Communications and Networks, Jun. 22, 2009, 9 pages.

Simonite, "One Smart Phone, Two Personalities", http://www.technologyreview.com/communications/38865/, Retrieved Jan. 10, 2012,Oct. 13, 2011, 3 Pages.

Smailagic, et al., "Location Sensing and Privacy in a Context-Aware Computing Environment", IEEE Wireless Communications—retrieved from <http://diuf.unifr.ch/pai/education/2002_2003/seminar/winter/telecom/01043849.pdf> on Feb. 5, 2009, Oct. 2002, pp. 10-17.

"One user, many hats; and, sometimes, no hat?towards a secure yet usable pda", Security Protocols Workshop, Springer Verlag, 2004, 14 Pages.

Sun, et al., "Signal Processing Techniques in Network-aided Positioning", IEEE Signal Processing Magazine—Available at <http://www.cspl.umd.edu/sig/publications/sun_survey_200507.pdf>, Jul. 2005, pp. 12-23.

Talbot"App Battles Driver Distraction but Spares Passengers", Technology Review India published by MIT, http://www.technologyreview.in/news/426889/app-battles-driver-distraction-but-spares-passengers,Feb. 14, 2012, 2 pages.

Temporale, "Removing Application Lock on Windows Mobile Standard Devices", http://www.mobilejaw.com/articles/2009/09/removing-application-lock-on-windows-mobile-standard-devices/, Retrieved on Oct. 13, 2011,Sep. 4, 2009, 10 Pages.

Wang, et al., "A Framework of Energy Efficient Mobile Sensing for Automatic User State Recognition", Proceedings of the 7th international conference on Mobile systems, applications, and services, Jun. 2009, 14 pages.

Weilenmann, et al., "Local Use and Sharing of Mobile Phones", In B. Brown, N. Green & R. Harper (Eds.) Wireless World: Social and Interactional Aspects of the Mobile Age. Godalming and Hiedleburg: Springer Verlag, 2001, pp. 99-115.

Woodman, et al., "Pedestrian Localisation for Indoor Environments", Proceedings of the 10th international conference on Ubiquitous computing, Sep. 2008, 10 pages.

Youssef, et al., "The Horus WLAN Location Determination System", Department of Computer Science, University of Maryland, retrieved from <http://www.cs.umd.edu/~moustafa/papers/horus_usenix.pdf> on Feb. 5, 2009,2005, 14 pages.

Yu, et al., "Personalized Awareness and Safety with Mobile Phones as Sources and Sinks", Proceedings of Urbansense, workshop held in conjunction with SenSys, Nov. 4, 2008, pp. 26-30.

"Context-based Cooperation in Mobile Business Environments—Managing the Distributed Execution of Mobile Processes", Business & Information Systems Engineering, Apr. 2009, pp. 301-314.

Zhang, et al., "The Two Facets of the Exploration-Exploitation Dilemma", Proceedings of the IEEE/WIC/ACM International Conference on Intelligent Agent Technology (IAT '06), retrieved from <http://ieeexplore.ieee.org/ielx5/4052878/4052879/04052945.pdf?tp=> on Feb. 5, 2009,2006, 7 pages.

Zhuang, et al., "Improving Energy Efficiency of Location Sensing on Smartphones", In Proceedings of MobiSys 2010—Available at <http://www.deutsche-telekom-laboratories.com/~kyuhan/papers/MobiSys10Kim.pdf>, Jun. 2010, 15 pages.

"Mobile Task Tracker Screen Shots", Retrieved from <http://www.mobiletasktracker.com/Screen%20 Shots.html>, (Jul. 13, 2011), 4 Pages.

"PCT Search Report and Written Opinion", Application No. PCT/US2012/071545, (Mar. 28, 2013) 9 pages.

"PCT Search Report and Written Opinion", Application No. PCT/US2012/071559, (Mar. 28, 2013),10 pages.

"PCT Search Report and Written Opinion", Application No. PCT/US2012/071555, (Apr. 25, 2013), 9 pages.

"PCT Search Report and Written Opinion", Application No. PCT/US2012/071546, (Apr. 29, 2013),10 pages.

Cui, Yanqing "Facilitating Consumption of Online Social Networking Services on Mobile Devices", *Proceedings of the 13th international conference on Ubiquitous Computing*, (Sep. 17, 2011), 4 Pages.

Niino, Junichi "There was free enterprise microblogging, Japanese were developed "youRoom"!just mutter", Free plan upgrade Retrieved from <http://www.publickey1.jp/blog/10/youroom.html>(Dec. 21, 2010), 4 Pages.

"Final Office Action", U.S. Appl. No. 13/222,538, May 28, 2013, 43 pages.

"Final Office Action", U.S. Appl. No. 13/875,139, May 9, 2014, 15 Pages.

"Foreign Notice of Allowance", CN Application No. 200980128048.8, Jun. 28, 2014, 6 Pages.

"Foreign Office Action", AU Application No. 2011312743, Jun. 20, 2014, 4 Pages.

"Foreign Office Action", CN Application No. 200980128048.8, Dec. 2, 2013, 7 pages.

"Foreign Office Action", CN Application No. 201110317851.5, Dec. 4, 2013, 14 pages.

"Foreign Office Action", CN Application No. 201110317851.5, May 8, 2014, 10 Pages.

"Foreign Office Action", EP Application No. 11831134.9, May 9, 2014, 3 Pages.

"International Search Report and Written Opinion", Application No. PCT/US2011/049614, Mar. 26, 2012, 7 pages.

"Non-Final Office Action", U.S. Appl. No. 12/897,586, May 8, 2014, 12 pages.

"Non-Final Office Action", U.S. Appl. No. 13/222,538, Oct. 11, 2013, 38 pages.

"Non-Final Office Action", U.S. Appl. No. 13/328,312, Aug. 6, 2013, 18 pages.

"Non-Final Office Action", U.S. Appl. No. 13/726,027, Jun. 24, 2014, 17 pages.

"Non-Final Office Action", U.S. Appl. No. 13/726,090, Jun. 24, 2014, 28 pages.

(56) References Cited

OTHER PUBLICATIONS

"Non-Final Office Action", U.S. Appl. No. 13/875,139, Oct. 3, 2013, 12 pages.
"Notice of Allowance", U.S. Appl. No. 13/726,097, Jun. 10, 2014, 7 pages.
"Restriction Requirement", U.S. Appl. No. 13/726,048, Jun. 20, 2014, 5 pages.
"Supplementary Search Report", EP Application No. 11831134.9, Apr. 3, 2014, 3 pages.
Moran, et al., "Getting Started with Windows 7", 2009, 412 pages.
"Corrected Notice of Allowance", U.S. Appl. No. 13/726,097, Oct. 1, 2014, 2 pages.
"Corrected Notice of Allowance", U.S. Appl. No. 13/726,097, Aug. 21, 2014, 2 pages.
"Final Office Action", U.S. Appl. No. 13/726,090, Oct. 2, 2014, 30 pages.
"Final Office Action", U.S. Appl. No. 13/726,099, Aug. 29, 2014, 10 pages.
"Foreign Office Action", AU Application No. 2011312743, Aug. 15, 2014, 4 Pages.
"Non-Final Office Action", U.S. Appl. No. 13/726,043, Sep. 11, 2014, 14 pages.
"Non-Final Office Action", U.S. Appl. No. 13/875,139, Oct. 24, 2014, 15 Pages.
"Notice of Allowance", U.S. Appl. No. 12/897,586, Oct. 15, 2014, 13 Pages.
"Extended European Search Report", EP Application No. 12859600.4, May 13, 2015, 7 pages.
"Final Office Action", U.S. Appl. No. 13/726,095, May 8, 2015, 13 pages.
"Final Office Action", U.S. Appl. No. 13/726,099, May 8, 2015, 11 pages.
"Foreign Office Action", CL Application No. 201300886, Feb. 2, 2015, 7 pages.
"Foreign Office Action", EP Application 12859972.7, May 26, 2015, 4 pages.
"Mobile Phone Match-up", Retrieved at: <http://www.microsoft.com/windowsmobile/enus/meet/version-compare.mspx>, Jul. 27, 2010, 4 pages.
"Notice of Allowance", U.S. Appl. No. 13/875,139, Mar. 5, 2015, 7 pages.
"Setting up and Using Smart Unlock on the Samsung Jet", Retrieved at: <http://www.knowyourmobile.com/samsung/samsungjet/samsungjetuserguides/317988/setting_up_and_using_smart_unlock_on_the_samsung jet.html>, Jun. 20, 2010, 2 pages.
"Supplementary European Search Report", EP Application No. 12859972.7, Apr. 30, 2015, 3 pages.
"T-Mobile G1 Google Android Phone—Gesture Unlocking", Retrieved at: <http://www.gadgetuniversegift.com/?p=2121>, Jun. 20, 2010, 2 pages.
"T-Mobile G1 User Manual", pp. 102-103, May 27, 2009, 5 pages.
Bhandari,"Full Touchscreen Samsung Star (S5233), Star 3G (S5603) and Beat DJ Launched in India", Retrieved at: http://www.tecfre.com/full-touchscreen-samsung-star-s5233-star-3g-s5603-and-beat-dj-launched-in-india/, May 11, 2009, 12 pages.
Chen,"Here's the Google Phone Apple Wants You to Have", Retrieved at: http://www.wired.com/2010/03/apple-htc-google/, Mar. 5, 2010, 9 pages.
Ciprian,"Manage User Accounts", Retrieved at: http://www.vista4beginners.com/Manage-User-Accounts, May 8, 2007, 13 pages.
"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.
"Final Office Action", U.S. Appl. No. 12/417,752, Feb. 25, 2014, 22 Pages.
"Final Office Action", U.S. Appl. No. 13/090,474, Nov. 25, 2014, 13 pages.
"Final Office Action", U.S. Appl. No. 13/726,027, Jan. 5, 2015, 19 pages.
"Final Office Action", U.S. Appl. No. 13/726,043, Mar. 3, 2015, 19 pages.
"Foreign Notice of Allowance", AU Application No. 2011312743, Nov. 25, 2014, 2 Pages.
"Foreign Office Action", CL Application No. 201200886, Feb. 3, 2015, 6 Pages.
"Foreign Office Action", CN Application No. 201110317851.5, Nov. 14, 2014, 15 Pages.
"Foreign Office Action", EP Application No. 12859485.0, Feb. 12, 2015, 5 pages.
"Foreign Office Action", EP Application No. 12860631.6, Feb. 16, 2015, 5 pages.
"How can I see a list of all users on the logon screen?", Retrieved from <http://superuser.com/questions/354856/how-can-i-see-a-list-of-all-users-on-the-logon-screen> on Jan. 6, 2015, Nov. 7, 2011, 2 pages.
"How can one add an image to the windows 7 login screen? A", Retrieved from <http://superuser.com/questions/470568/how-can-one-add-an-image-to-the-windows-7-login-screen > on Jan. 6, 2015., Sep. 5, 2012, 4 pages.
"In Case of Emergency (ICE) and smart phone with lock screens", Ars Technica Open Forum—Retrieved at: http://arstechnica.com/civis/viewtopic.php?f=20&t=1140661, Mar. 29, 2011, 8 pages.
"Non-Final Office Action", U.S. Appl. No. 13/090,474, May 6, 2014, 12 pages.
"Non-Final Office Action", U.S. Appl. No. 13/726,040, Jan. 28, 2015, 14 pages.
"Non-Final Office Action", U.S. Appl. No. 13/726,048, Dec. 9, 2014, 12 pages.
"Non-Final Office Action", U.S. Appl. No. 13/726,092, Feb. 12, 2015, 21 pages.
"Non-Final Office Action", U.S. Appl. No. 13/726,095, Jan. 5, 2015, 14 pages.
"Non-Final Office Action", U.S. Appl. No. 13/726,095, Aug. 15, 2014, 12 pages.
"Non-Final Office Action", U.S. Appl. No. 13/726,099, Jan. 7, 2015, 10 pages.
"Notice of Allowance", U.S. Appl. No. 12/897,586, Jan. 5, 2015, 7 Pages.
"Restrict Access to Programs with AppLocker in Windows 7", Retrieved from <http://www.howtogeek.com/howto/6317/block-users-from-using-certain-applications-with-applocker> on Jan. 6, 2015., Nov. 12, 2009, 9 pages.
"Supplemental Notice of Allowance", U.S. Appl. No. 12/897,586, Mar. 3, 2015, 2 Pages.
"Supplementary European Search Report", EP Application No. 12860631.6, Jan. 5, 2015, 3 pages.
"Timeline of Microsoft Windows", Retrieved from <http://en.wikipedia.org/wiki/Timeline_of_Microsoft_Windows> on Jan. 6, 2015, Dec. 14, 2014, 5 pages.
Lifehacker, "Get the Most Out of Your iPhone's Notification Center, from Beginner to Jailbreaker", Available online at <http://lifehacker.com/5882947/get-the-most-out-ofios-Ss-notification-center-frombeginner-to-jailbreakerl>, retrieved on Jul. 29, 2014, Feb. 7, 2012, 8 pages.
Osxdaily, "How to Use the lock Screen Camera in iOS 5.1", Available online at <http://osxdaily.com/2012/03/08/lock-screen-camera-ios-5-1>, retrieved on Jul. 29, 2014, Mar. 8, 2012, 10 pages.
"How to Replace and Customize Android Lock Screen [Guide]", Retrieved at: http://www.addictivetips.com/mobile/how-to-replace-and-customize-android-lock-screenguide/, Jun. 10, 2011, 14 pages.
"Supplementary European Search Report", EP Application No. 12859485.0, Jan. 23, 2015, 4 pages.
"Final Office Action", U.S. Appl. No. 12/897,586, May 22, 2013, 4 pages.
"Final Office Action", U.S. Appl. No. 13/726,048, Aug. 5, 2015, 13 pages.
"Final Office Action", U.S. Appl. No. 14/686,300, Jul. 29, 2015, 13 pages.
"Foreign Office Action", CL Application No. 201300886, May 13, 2015, 7 pages.

(56) References Cited

OTHER PUBLICATIONS

"Foreign Office Action", CN Application 201110317851.5, May 20, 2015, 8 pages.
"Foreign Office Action", EP Application No. 12859600.4, Jun. 1, 2015, 8 Pages.
"Foreign Office Action", EP Application No. 12860373.5, Jul. 7, 2015, 6 pages.
"Foreign Office Action", JP Application No. 2013-532806, Jun. 10, 2015, 11 pages.
"Non-Final Office Action", U.S. Appl. No. 12/897,586, Oct. 18, 2012, 12 pages.
"Non-Final Office Action", U.S. Appl. No. 13/726,027, Aug. 13, 2015, 20 pages.
"Non-Final Office Action", U.S. Appl. No. 13/726,090, Jun. 23, 2015, 31 pages.
"Non-Final Office Action", U.S. Appl. No. 14/495,418, Jul. 2, 2015, 18 pages.
"Non-Final Office Action", U.S. Appl. No. 14/686,300, Jun. 8, 2015, 11 pages.
"Supplementary European Search Report", EP Application No. 12860373.5, Jun. 25, 2015, 3 pages.
Greenwald, et al., "How to Set Up an Ice Contact on Your iPhone", Posted in Ice Contacts, the Backup Plan by Stufproductions, Jun. 21, 2010, 20 Pages.

* cited by examiner

MOBILE DEVICE EMERGENCY SERVICE

RELATED APPLICATION

This application claims priority to U.S. Provisional Application Ser. No. 61/580,131 filed Dec. 23, 2011 entitled "Mobile Device Safe Driving," U.S. Provisional Application Ser. No. 61/580,137 filed Dec. 23, 2011 entitled "Mobile Device Parental Control," and to U.S. Provisional Application Ser. No. 61/580,143 filed Dec. 23, 2011 entitled "Mobile Devices Family Coordination", the disclosures of each are incorporated by reference herein in their entireties.

BACKGROUND

Computing, communication, and entertainment devices, such as mobile phones, portable computers, tablet devices, and the like increasingly offer more functions, applications, and features which can make it difficult and/or inefficient for a user to discover, navigate, and utilize. For example, not only can a mobile phone be used for text, email, and voice communications, but may also be used for entertainment, such as to listen to music, surf the Internet, watch video content, gaming, and for photo and video imaging. Similarly, a portable tablet device may be utilized for email, browser, navigation, and other computing applications, as well as for the various entertainment and photo features. In addition to the many computing, communication, and entertainment applications that are available to a user of a mobile phone or tablet device, a seemingly unlimited number of third-party applications and features are also available for download to a device.

Many of the functions, applications, and features of the various computing, communication, and entertainment devices are beneficial to a user, and can enhance one's personal time as well as work and social activities. For example, children can let their parents know by text message or with a phone call from a mobile phone their whereabouts or that they have safely arrived at a particular destination. However, children and teenagers with connected mobile devices may have difficulty balancing the time that they spend in front of the many various devices, commonly referred to as "screentime", with other activities, including spending time with their family and getting enough sleep. Parents often have to regulate the amount of children's time with devices, such as texting, talking on the phone, watching television, and surfing the Internet. When children over use such devices, the parents may have to step-in and physically separate a device from a child, such as by taking a mobile phone or tablet computer away at bedtime. A more significant trend and increasing problem with these always-connected mobile devices is distracted driving. Many drivers, and particularly teenage drivers, are tempted to send a quick text, make a call, or check a voice message while driving, which may lead to an accident.

SUMMARY

This Summary introduces simplified concepts of mobile device emergency calls, and the concepts are further described below in the Detailed Description and/or shown in the Figures. This Summary should not be considered to describe essential features of the claimed subject matter, nor used to determine or limit the scope of the claimed subject matter.

In embodiments, a client device includes one or more modules implemented at least partially in hardware and configured to implement an emergency service. The emergency service configured to support operations including generating a user interface for display on a display device, receiving one or more inputs usable to form an emergency contacts list that includes a plurality of emergency contacts, and causing the emergency contacts list to be communicated to one or more other client devices for use in generating a message to be communicated automatically and without user intervention to the emergency contacts in the emergency contacts list responsive to a trigger.

In embodiments, a device has an integrated display device to display an emergency contacts selectable control in a user interface, where the emergency contacts selectable control is implemented for user selection and may be selected from a phone lock screen to display emergency contacts without unlocking functions of the device. The device implements an emergency service that can receive an input of the emergency contacts selectable control to display an emergency contacts list, and then initiate a display of the emergency contacts that are designated for members whose mobile devices are associated in a hub.

In embodiments, the emergency service is implemented to manage the hub that is a private, shared space of the family members. The family hub includes shared member contacts and the emergency contacts can be designated as a subset of the member contacts. The family emergency service can generate the emergency contacts list from shared family member contacts responsive to the input of the emergency contacts selectable control, so as to dynamically generate the emergency contacts list based on the member who is associated with the particular device.

In embodiments, the user interface that displays the emergency contacts selectable control may be a phone lock screen that indicates functions of the device are locked. The phone lock screen may include one or more of the emergency contacts displayed for user selection to initiate a phone call to a selected emergency contact. The emergency contacts selectable control is also user selectable from the phone lock screen to initiate the display of the emergency contacts list without unlocking the functions of the device. In an event that a user enters an incorrect passcode to unlock the functions of the device, the emergency contacts list may also be initiated for display based on the entered incorrect passcode. The emergency contacts can be displayed as selectable controls in the emergency contacts list and are user selectable to initiate a phone call to a selected emergency contact, even if the functions of the device are locked.

In embodiments, a hub system includes a network service (e.g., a network of one or more server devices) that executes computer instructions as a emergency service. The emergency service is implemented to receive a request from a mobile device to generate an emergency contacts list that includes emergency contacts designated for members whose mobile devices are associated in a hub. The emergency service can generate the emergency contacts list from shared member contacts and based on the member who is associated with the mobile device, and then communicate the emergency contacts list to the mobile device to display the emergency contacts as selectable controls for user selection to initiate a phone call to a selected emergency contact.

BRIEF DESCRIPTION OF THE DRAWINGS

Embodiments of mobile device emergency calls are described with reference to the following Figures. The same numbers may be used throughout to reference like features and components that are shown in the Figures.

DETAILED DESCRIPTION

The prevalence of mobile devices is ever increasing and consequently a likelihood that a user has a mobile device with them "at any time" has also increased. For example, users may avail themselves of mobile phones, tablets, and so on and carry these devices with them as part of their everyday life. Accordingly, these devices may be available to users in emergency situations, such as to contact authorities for help. However, conventional techniques that were made available to users to ask for this help were often fractured and limited to contact of traditional services, e.g., 911.

Emergency service techniques are described. In one or more implementations, a mobile device employs an emergency service to make a variety of functionality available. This functionality may include an ability of users to specify non-traditional emergency contacts, such as a parent, guardian, teacher, employer, and so on that are to be contacted in an emergency situation. The mobile device, for instance, may be configured to generate a message responsive to a trigger, such as dialing of 911, an output of a biomedical sensor, location positioning information, and so on. The message may then be communicated automatically and without user intervention to the emergency contacts specified by the user. For example, a father may automatically receive a text message responsive to the dialing of 911 on a child's phone. Further, this emergency contact list may leverage functionality of a hub, such that the list is automatically populated to members of the hub. A variety of other examples are also contemplated, further discussion of which may be found in relation to the following sections.

While features and concepts of emergency service techniques can be implemented in any number of different devices, systems, networks, environments, and/or configurations, embodiments of mobile device emergency calls are described in the context of the following example devices, systems, and methods.

Example Environment

Figure 1:
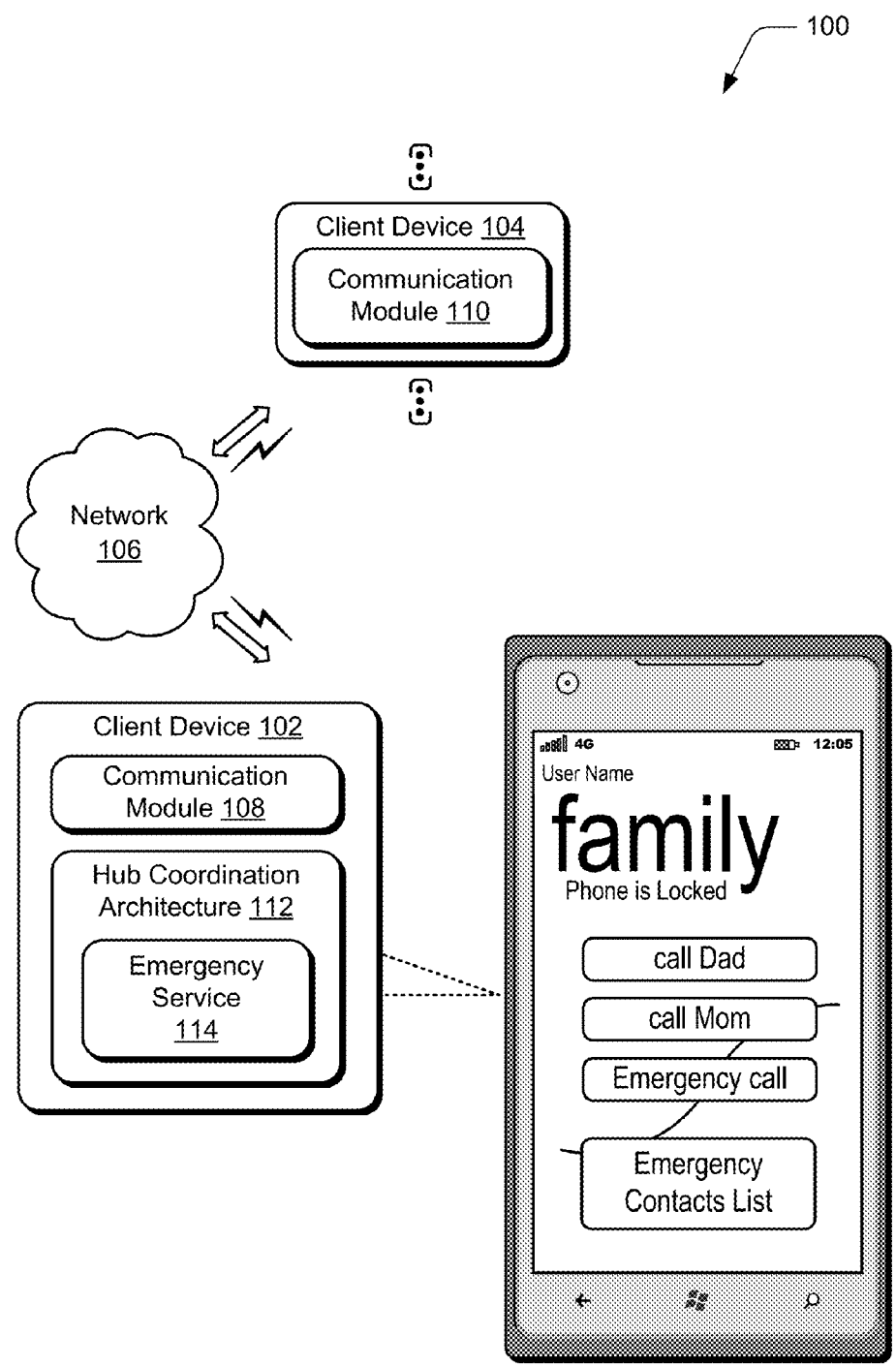
FIG. 1 illustrates an example system in which embodiments of mobile device emergency calls can be implemented.

FIG. 1 illustrates an example environment 100 in which various embodiments of a mobile device emergency service can be implemented. The example system includes a client device 102 communicatively coupled to another client device 104 via a network. The client devices 102, 104 may be configured according to a variety of different computing device configurations. In the illustrated example, the client device 102 is configured as a mobile device, such as a mobile phone 104 although other mobile device configurations are also contemplated, such as a tablet device, communication device, convertible device, entertainment, gaming, navigation, and/or other type of portable electronic device. The client devices 102, 104 may also assume a variety of other computing device configurations, such as traditional PCs, laptops, and so on. Although a single instance of the client device 104 is illustrated, this device may be representative of a plurality of different devices and thus reference in the following discussion may be made to client device 104 in single or in plural form. Additional examples of functionality that may be incorporated as part of the client device 102, 104 may be found later in the discussion.

The client devices 102, 104 are illustrated as including respective communication modules 108, 110. The communication modules 108, 110 are representative of functionality of the devices to communicate via the network 106, such as to communicate with each other. The communication modules 108, 110 may perform this communication using a variety of techniques, such as to support voice communication, text messaging (e.g., SMS, MMS), instant messaging, communication via a social network service, email, near-field communications (NFC) and so on. Accordingly, the client device 102, 104 may utilize a variety of different techniques to communicate with each other.

The client device 102 is also illustrated as supporting a hub coordination architecture 112. The hub coordination architecture 112 is representative of functionality to provide a hub that supports communication between members of the hub to share data. The hub, for instance, may include a user interface via which users of the client device 102, 104 may share content based on membership to the hub. Accordingly, the membership may act to support appropriate permissions on content between the users of the hub based on membership to the hub. A variety of different content may be shared via the hub, such as messaging, photos, links, background image of the hub, videos, and so on.

Designated member relationships can be utilized to define how the data and information is managed in relation to the hub, and can be implemented to leverage the social contract embodied in the hub. In embodiments, the hub is implemented by the hub coordination architecture 112 as a user interface and/or a client device application for integration and aggregation of the hub-orientated communications, activities, and information. A hub can be implemented as a private, shared space that is limited to access by defined members of the hub. The hub, for instance, may contain links to other members' profiles, and based on restriction settings, allows aggregation for visibility of some of other members' data and information within the hub, and so on. The hub may also be configured to share a group calendar which can be viewed and edited, a common text message window, a posting board, a shared photo album, a check-in feature, and any other type of shared information as further described as follows and show in relation to FIG. 2.

An example of this functionality is illustrated in FIG. 1 as an emergency service 114. The emergency service 114 is representative of functionality to share data indicating a location of a member of a hub with other members of the hub. In this way, members of a hub can "check in" with each other regarding a location of the members. A daughter included in a family hub, for instance, may utilize this functionality to inform other members of the family hub (e.g., parents, siblings, and so on) the she has arrived safely at school. Thus, in this example, the family hub may be used to disseminate messages of other members of the hub in an efficient and intuitive manner. Other examples are also contemplated, such as to share data between members of a workgroup to monitor employees and so forth.

The emergency service 114, for instance, may be used to cause communication of emergency information. This may include a geographic location (e.g., latitude/longitude coordinates, cell phone tower, street location, zip code) along with a timestamp and identifier of the user using the client device 102 to another client device 104. The other client device 104, for instance, may be member of a hub to which a user of client device 102 belongs. This communication may be performed in a variety of ways, such as encoded as part of a URL, via text message, instant message, email, and so forth. Additionally, this communication may be performed automatically and without user intervention responsive to a trigger, such as the dialing of 911 by the phone to send a text message.

Selection of the communication by a user of client device 104 may then cause output of a map indicating a location of client device 102. A variety of other functionality may be supported, such as to output directions upon a "tap" of the user's location such that a user of client device 104 may journey to a geographic location of client device 102, and so on. The output of the map, for instance, may be performed using a browser, may be performed as part of the hub coordination architecture 112 as further described later in the discussion, and so on. Thus, although described as part of the hub, various embodiments of the client emergency service may be implemented or integrated independently of a hub.

Figure 2:
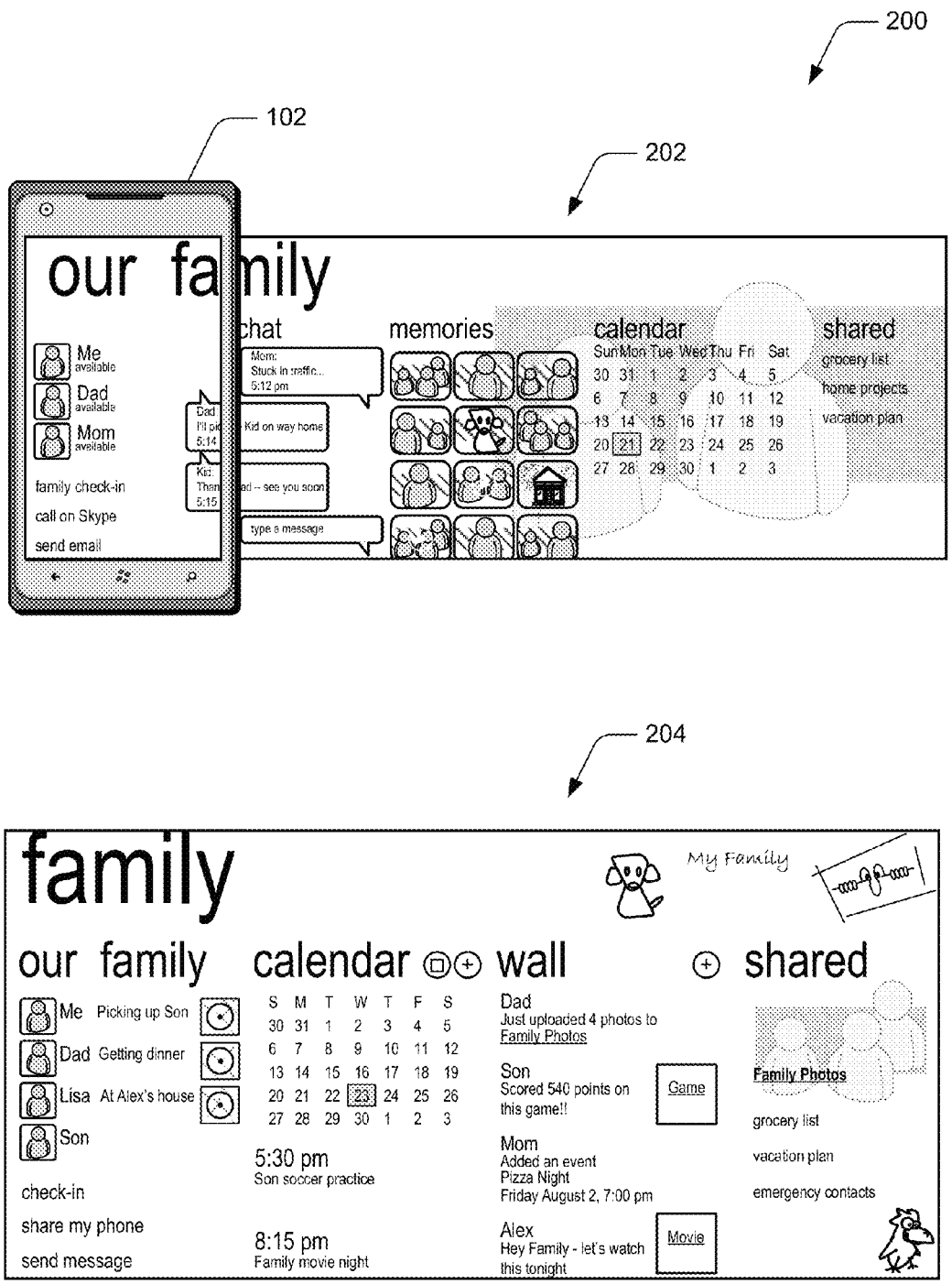
FIG. 2 illustrates examples of a hub in accordance with one or more embodiments.

FIG. 2 is an example of a system 200 showing two different examples of hub user-interfaces for a family-orientated hub. The description, layout, orientation, features, and organization of the text, images, photos, graphics, links, data, information, and presentation features shown with reference to the hub user interfaces, as well as with reference to any other user interfaces described herein and/or shown in the figures, are merely examples that may be altered in any aspect for various embodiments and/or implementations of mobile device check-in.

The hub is a central space for membership-orientated coordination of communications, activities, information, and integration. Designated member relationships can be utilized to define how the data and information is managed, and can be implemented to leverage the social contract, such as between members of a defined familial group in the illustrated example. In one or more implementations, the hub is implemented as a user interface (e.g., via a client device application) for integration and aggregation of the membership-orientated communications, activities, and information. A hub can be implemented as a private, shared space between defined members. The hub contains links to other members' profiles, and based on restriction settings, allows aggregation for visibility of some of other members' data and information within the hub. The hub shares a group calendar which can be viewed and edited, a common text message window, a posting board, a shared photo album, a check-in feature, and any other type of shared information.

Devices and/or device accounts can be associated within a set of devices or device accounts (e.g., a family phone account, user accounts, a connected set of devices, and so on), and all or a subset of the devices or accounts can communicate with other devices or accounts. The members of a hub can be defined by any number of different classes of people, such as Junior, Teen, Mom, Dad, (or Parent), Grandparent, Nanny, Life-Coach, and so on for the illustrated example of a family. Further, the members of a family can be defined to distinguish a live-in Nanny from a Babysitter, for example.

Additionally, membership of the hub as well as use of the hub by the members can be controlled by a select collection of users, such as one or two mobile phones by the associated users of the client devices. For example, one of the members in the hub can be the designated control person, such as Mom who runs the household, employer, and so on.

From a single configuration of the members, the hub can be provisioned, setup, and propagated out, e.g., automatically. The features and configuration of a hub may default to an automatic, easy setup, but any rule, feature, or configuration aspect can be readily modified by a user. Provisioning a hub may be based on billing, e.g., a family billing plan. However, if a phone device is changed to a different carrier, for example, the phone device can still receive texts related to the hub. Alternatively or in addition, provisioning a hub can be based on email addresses, phone numbers, user account identifiers, or any other identifier.

A retail person selling a new phone package, for instance, can easily identify the members each to their new phone devices and initiate the hub being instantiated. From a consumer perspective, it just works and members can walk out of the store all set up. All of the data and information can be shared with a single selection, and thus the members do not have to share each item (e.g., a grocery list, photos, calendar, etc.) individually and separately.

The hub user interface may act as a shared space that is customizable and provides for user-generated and shared content. Some information can be shared, while other information is not. For example, Mom's complete Christmas list is not viewable by the other family members, but Dad and Kids can add to the list (and only view their contribution). Hub setup may be performed "a la carte," meaning only the features that members want displayed on the hub wall can be selected. For example, Mom wants to see the shopping list, whereas Dad does not shop and so wants to avoid having the list displayed on his device, yet he could still access the shopping list to add items when desired.

The hub user interface integrates functions, calendar functionality, event and/or data summaries (i.e., on the "wall"), as well as content that is shared between the members of the hub (e.g., lists, documents, etc.). For example, the hub user interface may include a "family check-in" or "check-in" option. The hub user interface may also include a chat section where location check-ins messaged are displayed along with other messages interchanged between the members of the hub. The hub "wall" is representative of an area via which members of the group may add to as desired, like a lunchroom bulletin board, family refrigerator, and so on. In implementations, the information can be aggregated in pillars or columns and shown on the hub wall as illustrated. The hub wall can also represent an interrelation between any of the information and data that appears on the wall and its placement in time. The hub settings provide that a user can control which functions are integrated and displayed within the hub, such as on the wall.

The hub information may also be context relevant to the members of the hub, and the calendar includes shared hub events. Calendar updates can be posted as notice events on the wall, and a user can look at the wall to see upcoming hub events, or the events that pertain to one or more other members of the hub. Messaging may also be performed that is private among the members of the hub. A member can instant text (or other communication) to all other members in the hub. Texting—such as for a work meeting—can divide each members' display on their respective devices into individual screens for each member.

The hub may also be extensible, and may link to a hard drive on a home computer, or sync to just one of the other devices, the manager, or cloud control (e.g., from a network-based service). The hub may also be extensible to third parties that add a note on the hub wall, such as implemented with application program interfaces (APIs) for functions to post data to the hub. A third-party application, however, would not have access to the context of the hub wall, such as to obtain or display hub data. The private information and data could be encrypted and only decrypted by the phone devices that are associated with the hub.

Thus, the hub supported by the hub coordination architecture 112 may be thought of as a central space coordination of communications, activities, information, and integration of members of the hub. Hubs may be defined to support a variety of different membership, such as for family members, coworkers, friends, acquaintances, fan clubs, and so forth. Therefore, although examples are discuss that relate to a family in the following discussion it should be readily apparent that membership in the hub may be defined in a variety of other ways without departing from the spirit and scope thereof. Accordingly, the hub coordination architecture 112 may be used to support a variety of different functionality.

An example of this functionality is illustrated as an emergency service 114. The hub, for instance, may incorporate functionality of the emergency service such that emergency contacts for the family, as well as may include health alerts, such as if someone picks up or finds your phone after an accident may be communicated. The family hub can be temporarily shared with non-members, such as extended family, a nanny, for a wedding or other event, for workers at a conference, etc. Temporary groups may also be established with a hub. A parent or other controller can revoke membership in the hub and remove someone (i.e., their associated device) from the hub. Further discussion of the emergency service and hub may be found in relation to the following figure.

Safe Driving and Emergency Calls

Safe driving features reduce and/or eliminate the distractions associated with a mobile device while driving. A mobile device, such as a mobile phone, can be synced with the automobile being driven, and based on geo-location and/or acceleration rates, the mobile phone can be disabled or partially disabled, as well as implemented to interface with the automobile. The safe driving features can be implemented as a user interface and/or client device application or service. A safe driving implementation is not an application that can be uninstalled from a mobile device, and may be implemented as part of the operating system of a device. Alternatively, a safe driving application may downloaded to a mobile device as a third-party application.

Embodiments of safe driving include any one or combination of implementation features, such as described in the following paragraphs.

A safe driving disabled mode is an example of a safe driving feature that can be implemented for a mobile device when a user is operating a vehicle with a wireless beacon device associated with the vehicle (e.g., a Bluetooth hands-free speaker/microphone device). Mobile device safe driving provides that a restrictive disabled mode can temporarily disable a mobile device when the device is in the presence of both a vehicle wireless beacon device and another mobile device owned by an associated parent or guardian. In this manner, the solution does not present as a failure to the owner of the device. If the device owner is a teenager and Mom is driving, the teenager has normal access to the device capabilities. If the device owner is a teenager and he or she is driving, the safe driving mode can be disabled, but the solution relies on the presence of Mom to reinforce and/or remind the teenager of good driving habits. Safe driving mode implementations can dynamically change behaviors based on who is in the vehicle.

Devices and/or device accounts can be associated within a set of devices or device accounts (e.g., a family phone account, live accounts, a connected set of devices, etc.), and all or a subset of the devices or accounts can communicate with other devices or accounts. Mobile device safe driving can be implemented to restrict access to a phone based on GPS acceleration data, distinguished from the physical act of driving with car monitors. Safe driving is not tied to a particular vehicle, and can be related to other contextual information that is not registered by car monitors, such as loud music, distracting friends in the car, or other sources of distraction that range from passive to active behaviors. Safe driving information can be used to counter insurance claims of unsafe driving and rate increases, and not just for teenagers, but also senior citizens, drivers with DUI's, etc.

A safe driving mode user interface is implemented from which safe driving mode settings can be enabled and disabled, and there may be many levels of disabling device capabilities. For example, a safe driving mode can render the device completely disabled, or just text messaging is disabled to eliminate texting while driving, but not texting while a passenger in the vehicle. A device in safe driving mode can display an indication that a safe driving mode is enabled, such as an icon next to the current time/day and/or the words "Safe Driving Mode On" on a device home screen or lock screen. Safe driving mode settings can associate one or more vehicles to any user and/or number of devices. The safe driving mode settings can all be set remotely from an authoritative phone device, such as a parent's mobile phone.

Figure 3:
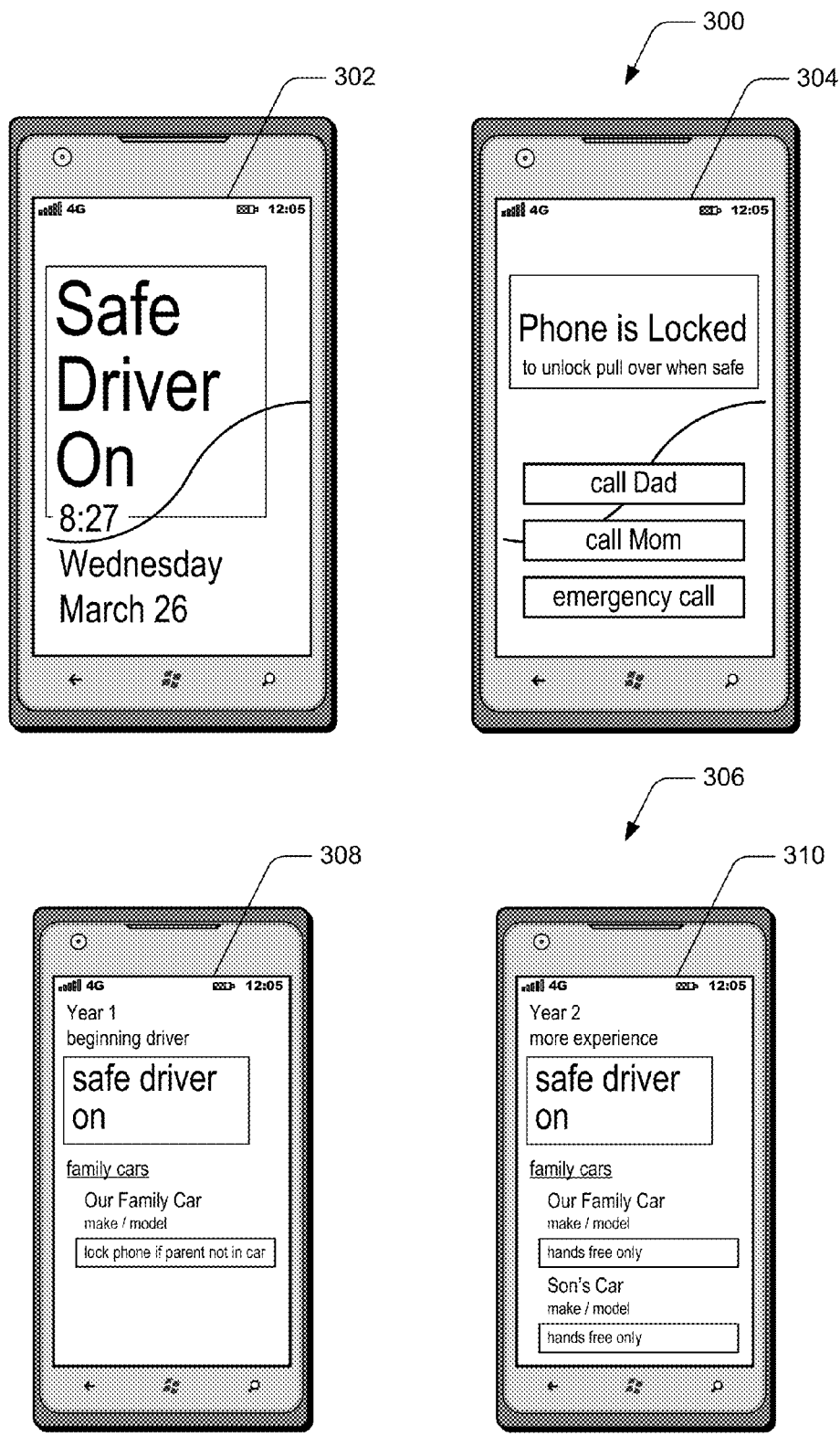
FIG. 3 illustrates examples of safe driving mode in accordance with one or more embodiments.

FIG. 3 illustrates examples 300 of safe driving mode user interfaces, such as a lock screen 302 displayed on a mobile phone when the safe driving mode is active in the presence of a vehicle. Another lock screen 304 is an example of a display that indicates the phone is locked, but capable of enabling critical functionality like emergency calls. In an example, safe driving mode settings 306 are illustrated for a teenager in two different years. In the first year 308 of driving, the teen is a new driver and has access only to the family car. In his first year, his parents have used the settings user interface to restrict his usage and lock the phone completely. In the second year 310 of driving, the teen has his own car and his parents have allowed him to move up to hands-free operation with both vehicles.

Embodiments of mobile device safe driving incorporate bi-directional communication with a vehicle, or can be implemented for no communication with the vehicle.

Mobile device safe driving can also be implemented to limit vehicle speed so that a teenage driver cannot exceed a designated speed limit, such as in a school zone. Safe driving can also communicate car service reminders to the driver, such as to change the oil, wiper blades, etc. At the time of a crash, the phone device can automatically report its status, send messages, alert emergency services, etc. An emergency may be due to a crash and based on crash impact data, or based on erratic inputs (e.g., due to diabetic, heart attack, blown tire, etc.) and slow the car and send a text message. An emergency and/or situation may also be based on a vehicle breakdown when the vehicle is pulled over to the side of the road at a detected location that would not typically be a stopping location.

Safe driving features and modes can be implemented for different levels of permissions for members, to loan a car to a friend, for valet monitoring, etc. The vehicle that is associated with a mobile phone and user can communicate independently of the device, such as indirectly through a cloud-based service to communicate safe driving mode notifications to a parent and/or hub members. A safe driving mode notification may alert a driver that he or she is going to be late for an appointment based on the current route of travel and destination. A message can then be generated to inform the driver to re-route, edit an errand list, update GPS, etc. For example, a driver may be on a list of errands for Mom with mom's car. When mom cancels one of the errands from the shared calendar, GPS informs the Kid driver to skip the next errand stop.

Safe driving features and mode implementations can also be utilized to manage a fleet of any type vehicles. As a driver approaches a vehicle, the driver's phone is identified to the vehicle and can be paired with the vehicle, such as via Bluetooth, WiFi, or other addressable device. This may be integrated with a keyfob location proximate the ignition switch in a vehicle and/or setup for different profiles based on the vehicle and phone to checkout a vehicle.

In a safe driving mode, a kid's phone can become a communication channel that a parent can open with his or her phone, such as to activate the kid's phone to record video and/or audio at its current location. This may also be auto-activated, such as when the kid's phone is in another car that has been detected driving erratically or at excessive speed to send a safe driving mode notification to the parent's phone device. Safe driving features and modes are not limited to the control of a parent over a teenage driver. Any person that wants to drive safer can initiate the safe driving features and modes on his or her device. For example, a rental car company can discount a driver if the driver implements safe driving mode while driving a rented car.

Safe driving features and modes can also provide warnings, messages, and notifications when driving in other countries or regions (e.g., regional or country specific safe driving), such as notifications of different road rules when driving in different countries. Safe driving features may also be implemented to recognize road and/or weather conditions, and provide warnings and notifications. Safe driving mode notifications can be filtered and optionally programmed. For events of a certain type, an immediate text message may be generated. Alternatively or in addition, a daily or weekly driving report can be generated and communicated.

Mobile device safe driving can utilize phone device sensors and features, such as to determine if a user is traveling on a train as a passenger, or determine bus pass information. A user passenger status may also be determined from audio and/or camera images used to determine one's space in car, train, or other vehicle. Features may also be implemented to determine media access control (MAC) address ranges to identify proximate conveyances (e.g., not just passing cars).

A safe driving application may be implemented in the vehicle for the bulk of the data processing, and the phone device is then a client device to the vehicle. Save driving features can incorporate a theft deterrent in the vehicle application that identifies only those phone devices that, when proximate or in the vehicle, allow the vehicle to start and be driven. Near field communication (NFC) tags can be implemented in the doors of a vehicle to identify proximate phone devices of associated users in the seats of the vehicle.

Figure 4:
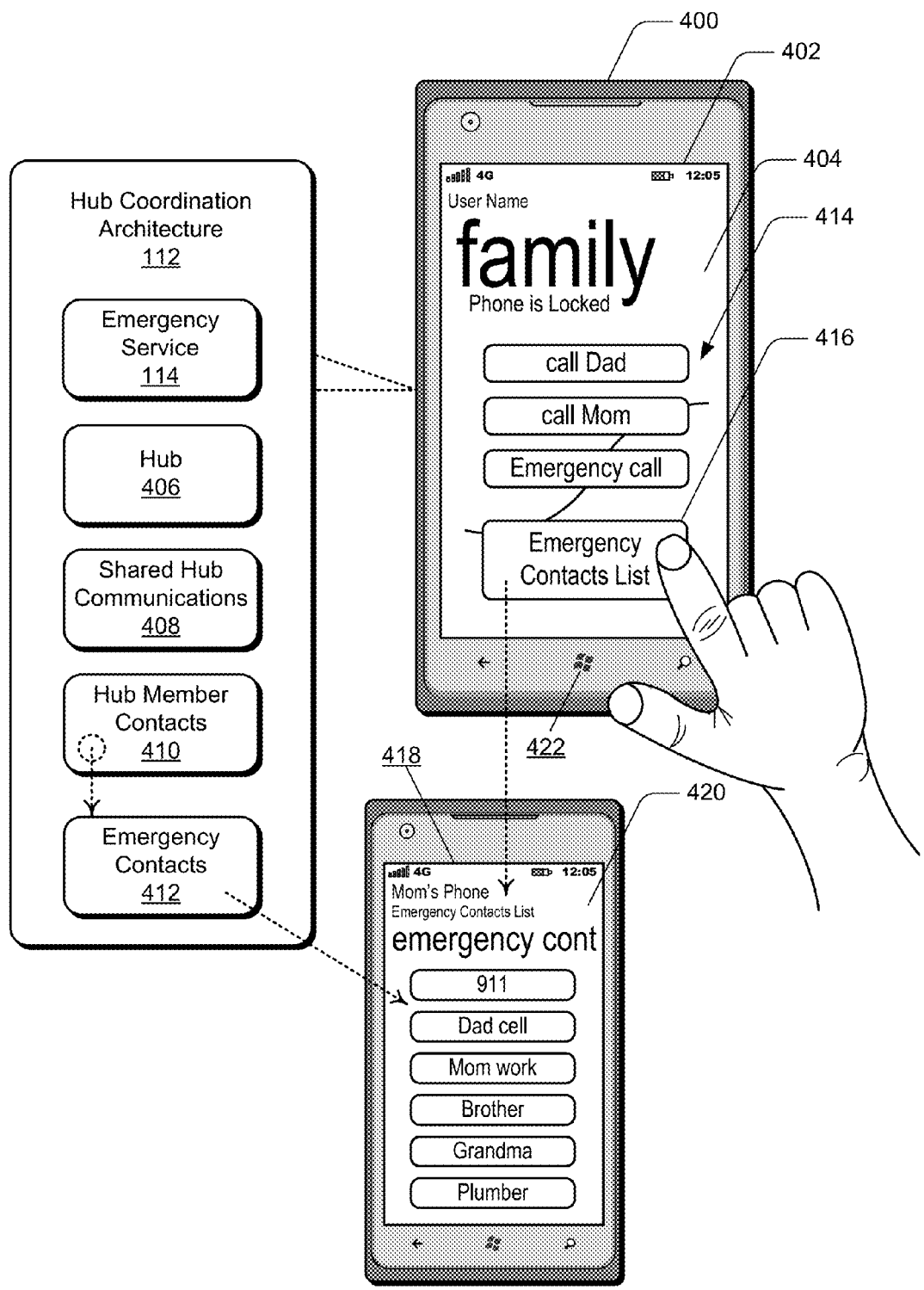
FIG. 4 illustrates an example mobile device in which embodiments of a mobile device emergency service can be implemented.

FIG. 4 illustrates an example mobile device 400 in which embodiments of mobile device emergency techniques can be implemented. The mobile device 400 is an example of the client device 102 or any of the other devices 104 described with reference to FIGS. 1-3. The mobile device includes the hub coordination architecture 112 and emergency service 114 as described in relation to FIG. 1. The mobile device can be implemented with various components, such as a processing and/or memory system, as well as any number and combination of differing components as further described with reference to the example device shown in FIGS. 8-11. The mobile device 400 includes an integrated display device 402 on which a user interface 404 can be displayed, such as one or more of the user interfaces of FIG. 3.

The mobile device 400 includes the hub coordination architecture 112, and is implemented to manage a hub 406 that is a private, shared space of the members as previously described. The hub coordination architecture 112 can be implemented to coordinate shared hub information, such as shared hub communications 408 and shared hub member contacts 410 that are associated with the hub members in the hub 406. As described above, the shared hub member contacts 410 may include service business contacts, such as a carpet cleaner and plumber, and can include contacts that are generally common to all of the hub members, such as Grandma, Mom and/or Dad's work number, as well as the mobile phone numbers for all of the respective hub members who are associated in the hub.

The shared member contacts 410 can also include designated emergency contacts 412 (e.g., a subset of the shared hub member contacts) that are accessible to the hub members who are associated in the hub that may be maintained by the emergency service 114. For example, the emergency contacts 412 can include "911" (as an optional default), Mom and/or Dad's work numbers and mobile numbers, as well as phone numbers for other hub members, such as Grandma or Brother. The emergency contacts 412 likely would not include the carpet cleaner, for example, but may also include the plumber and/or a neighbor as a designated emergency contact for the hub members who are associated in the hub.

The hub member contacts 410, and specifically which are designated as emergency contacts, may be populated through the membership of the hub. A controlling entity (e.g., parent), for instance, may cause specific emergency contacts to be located on client devices 104 of other members of the hub 406, such as a child, and so on. These emergency contacts may be leveraged in a variety of ways, such as to perform automatic communication responsive to a trigger as further described below after the discussion of the emergency contacts list.

In this example, the user interface 404 indicates that the particular mobile device 400 is locked and displays as a phone lock screen. Typically, a phone lock screen is an indication that functions of the device are locked or restricted and are not accessible for use without entering a passcode or PIN (personal identification number) into the device. The user interface 404 can display various emergency contacts as emergency selectable controls 414 that are user-selectable, such as user interface buttons for touch selection, to initiate a "911" emergency call or to initiate communication with a hub member. The emergency selectable controls 414 can be user-configurable to display one or more of the emergency contacts in the user interface.

In embodiments, the emergency selectable controls 414 also include an emergency contacts selectable control 416 for user selection to initiate a user interface 418 that displays an emergency contacts list 420 on the integrated display device of the mobile device. The emergency contacts list 420 includes the emergency contacts 412 that are designated for the hub members who are associated in the hub 406. In implementations, the emergency contacts selectable control 416 can be selected from a phone lock screen to initiate the display of the emergency contacts list 420 without unlocking the functions of the mobile device through use of the emergency service 114.

The emergency service 114 is implemented to receive an input of the emergency contacts selectable control 416 to initiate the display of the emergency contacts list 420. Alternatively or in addition, the mobile device 400 may include a dedicated display and/or hardware selectable button 422 that is user-selectable to initiate the display of the emergency contacts 412 list. Additionally, the emergency service may receive a user input of an incorrect passcode to unlock the functions of the device. For example, in the situation of a home emergency, a child may pick up Mom's phone and, even if the functions of the phone are locked, can initiate a phone call to a selected emergency contact with one of the emergency selectable controls 414.

Alternatively, the child can activate the emergency contacts list 420 with the emergency contacts selectable control 416 or the selectable button 422, or may enter a random, incorrect passcode that initiates the emergency contacts list for display. Further, an emergency responder may locate the mobile device at an accident site or on the person, and can activate an emergency call to one of the hub members with an emergency selectable control 414 or from the emergency contacts list 420.

In an embodiment, the hub coordination architecture 112 can generate the emergency contacts list 420 from the shared hub member contacts 412 responsive to receiving an input of the emergency contacts selectable control 416, an input of the selectable button 422, or when an incorrect passcode is received, and also based on the hub member who is associated with the device.

The emergency contacts list includes the emergency contacts designated for the hub members whose mobile devices are associated in the hub. For example, the user interface 418 indicates that the particular mobile device 400 is "Mom's Phone", and the emergency contacts list 420 associated with the particular device includes various emergency selectable controls for "911", Dad's cell phone number, and Mom's work number, as well as the other designated emergency contacts Brother, Grandma, and Plumber. In this example of Mom's Phone, the emergency contacts list includes Mom's work number as an emergency option, such as for a child that finds Mom's phone and wants to contact Mom at her place of work. Similarly, if the particular mobile device 400 was "Dad's Phone", then the emergency contacts list 420 may include Mom's cell phone number and Dad's work number.

As previously described, the emergency contacts list may be leveraged to support a variety of different functionality. For example, the emergency service 114 may be configured to generate and transmit messages responsive to a trigger. The trigger may include dialing of 911 or other emergency contact that causes additional type of communication to be performed. A child, for instance, may dial 911. This may act as a trigger to cause the emergency service 114 to generate a message, which may include characteristics of the trigger (e.g., dialed 911), to entities associated with the emergency contact list. This list, for instance, may be specified for members of a particular hub as well as include other entities "outside" the hub. A variety of other triggers are also contemplated, such as responsive to a biometric sensor output, use of the safe driving functionality described above, and so on.

Additionally, although different types of communications are described (e.g., voice to SMS, email, MMS, instant messaging) it should be readily apparent that the same type of communication may also be employed. For example, phone calls may be placed to members of the emergency contact list automatically and without user intervention having an automatically generated message after the call to 911 has been completed. An option may be displayed on the phone to forgo this functionality, e.g., in case the user of the phone did not want this communicated in instances in which the user was not in danger.

Figure 5:
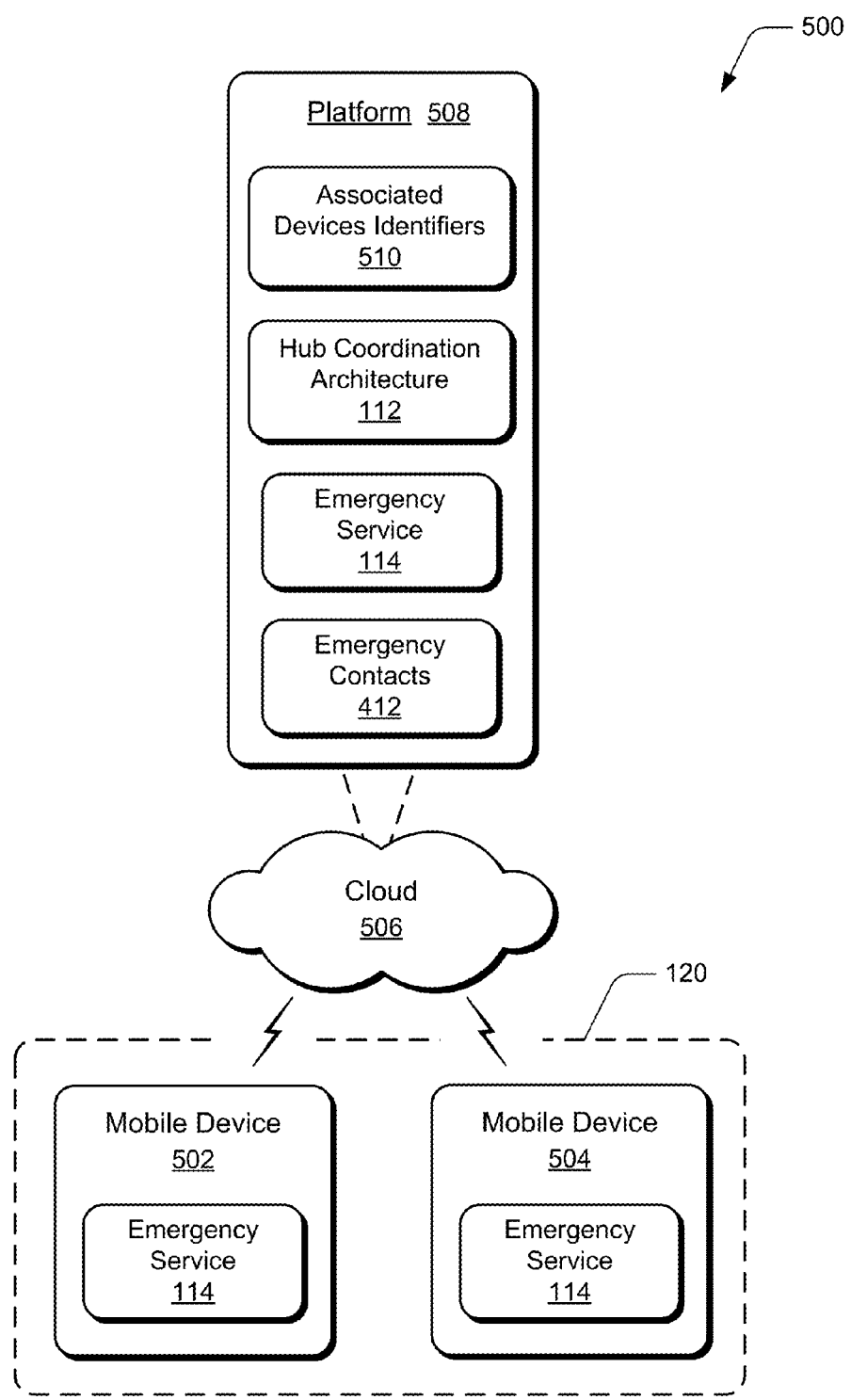
FIG. 5 illustrates an example system in which embodiments of mobile device emergency service can be implemented.

FIG. 5 illustrates an example system 500 that includes mobile devices 502 and 504 that are examples of the client device 102, any of the devices 104, or the mobile device 400 as described with reference to the previous FIGS. 1-4. In embodiments, the mobile devices 502 and 504 can each be associated with a different user, and the users are defined members of the hub illustrated through use of dashed lines, which may include two or more associated devices. The mobile devices each include an implementation of the emergency service 114 as described with reference to the previous FIGS. 1-4 to manage emergency call functionality of a hub. In the example system 500, multiple devices can be interconnected through a central computing device or system, which may be local to the multiple devices or may be located remotely from the multiple devices.

In embodiments, the central computing device may be a cloud 506 of one or more server computers that are connected to the multiple devices through a network, the Internet, or other data communication link. In embodiments, this interconnection architecture enables functionality across multiple devices to provide a networked service environment of the multiple devices. Each of the devices may have different physical configurations and capabilities, and the central computing device can utilize a platform 508 to maintain the associated devices identifiers 510, as well as implement the hub coordination architecture 112 along with the emergency service 114 and an implementation the hub that includes shared hub member contacts and the emergency contacts 510 in embodiments of mobile device emergency calls.

The cloud 506 includes and/or is representative of the platform 508 for the networked service components (e.g., the emergency service 114) that implements embodiments of mobile device emergency calls. The platform abstracts underlying functionality of hardware, such as server devices, and/or software resources of the cloud. The networked service components may include applications and/or data that can be utilized while computer processing is executed on servers that are remote from the mobile devices 502 and 504.

In embodiments, the emergency service 114 at the platform 508 is implemented to receive a request from a mobile device (e.g., one of the mobile devices 502 or 504) to generate an emergency contacts list that includes emergency contacts designated for hub members whose mobile devices are associated in a hub. The emergency service 114 can generate the emergency contacts list from shared hub member contacts and based on the hub member who is associated with the mobile device. The emergency service 114 can determine the associated devices based on the identifiers of the associated devices that associated with a hub. The emergency service can then initiate communication of the emergency contacts list from the platform 508 back to the mobile device to display the emergency contacts as selectable controls for user selection to initiate a phone call to a selected emergency contact. The emergency service 114 at the platform 508 can also implement any of the embodiments and features of mobile device emergency calls as described herein.

Example Procedures

The following discussion describes emergency call techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Example procedures 600 and 700 are described with reference to respective FIGS. 6 and 7 in accordance with one or more embodiments of mobile device emergency calls. Generally, any of the services, functions, procedures, procedures, components, and modules described herein can be implemented using software, firmware, hardware (e.g., fixed logic circuitry), manual processing, or any combination thereof. A software implementation represents program code that performs specified tasks when executed by a computer processor. The example procedures may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The procedures may also be practiced in a distributed computing environment by multiple computer devices. Further, the features described herein are platform-independent and can be implemented on a variety of computing platforms having a variety of processors.

Figure 6:
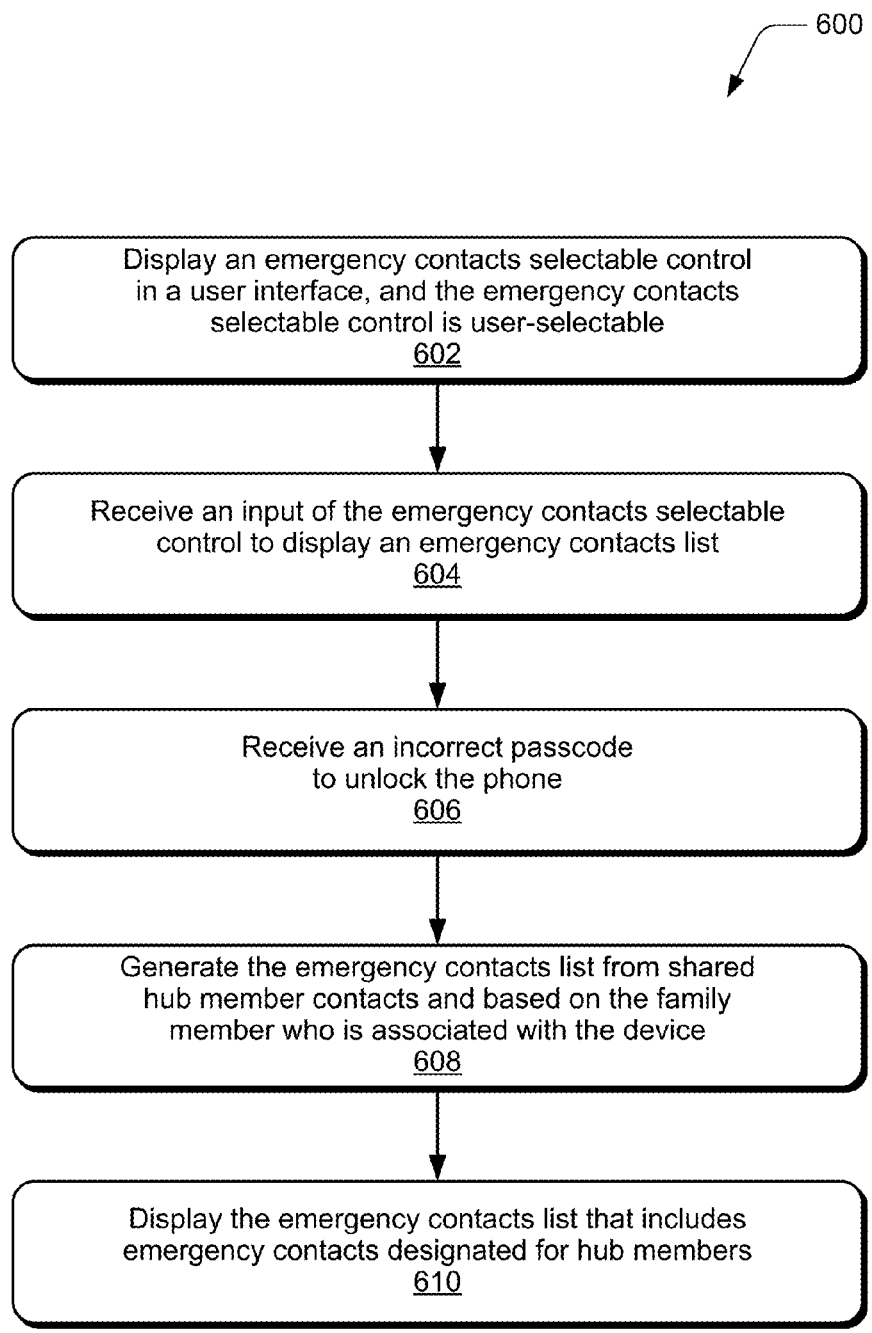
FIG. 6 illustrates example techniques of mobile device emergency calls in accordance with one or more embodiments.

FIG. 6 illustrates example procedures 600 of mobile device emergency calls. The order in which the procedure blocks are described are not intended to be construed as a limitation, and any number of the described procedure blocks can be combined in any order to implement a procedure, or an alternate procedure.

At block 602, an emergency contacts selectable control is displayed in a user interface, and the emergency contacts selectable control is user-selectable. For example, the mobile device 400 (FIG. 4) includes the integrated display device 402 on which a user interface 404 is displayed, such as a phone lock screen. The user interface 404 includes the emergency contacts selectable control 416, which is selectable from the phone lock screen to display the emergency contacts list 420 without unlocking the phone. The phone lock screen (e.g., user interface 404) may also include one or more of the emergency contacts 412 displayed as emergency selectable controls 414 for user selection to initiate a phone call to a selected emergency contact. Similarly, the various client devices 104 (FIG. 1) can each include an integrated display device to display a user interface that may be a phone lock screen, which includes an emergency contacts selectable control and/or other emergency selectable controls.

At block 604, an input of the emergency contacts selectable control is received to display an emergency contacts list. For example, the emergency service 114 of the hub coordination architecture 112 that is implemented at the mobile device 500 receives a user input of the emergency contacts selectable control 416 to initiate a display of the emergency contacts list 420 as shown in the user interface 416 on the integrated display device 402 of the mobile device. Alternatively, the emergency service 114 may receive a user input of the selectable button 422 that is user-selectable to initiate the display of the emergency contacts list. Similarly, the various client devices 104 (FIG. 1) can each implement a emergency service of a hub to receive an input of an emergency contacts selectable control to initiate the display of an emergency contacts list.

At block 606, an incorrect passcode to unlock the phone is received. For example, as an alternative or in addition to receiving an input of the emergency contacts selectable control (at block 604) or an input of the selectable button 422 on the mobile device 400, the emergency service 114 implemented at the mobile device receives an incorrect passcode as a user input to the mobile phone to initiate display of the emergency contacts list 420. Similarly, the emergency service 114 at the client device 102 can receive an incorrect passcode as a user input to initiate display of an emergency contacts list.

At block 606, the emergency contacts list is generated from shared hub member contacts and based on the hub member who is associated with the device. For example, the emergency service 114 implemented at the mobile device 400 generates the emergency contacts list 420 from the shared hub member contacts 410 responsive to receiving the input of the emergency contacts selectable control 416 (at block 604), responsive to an input of the selectable button 422, and/or responsive to receiving an incorrect passcode as a user input to the mobile phone (at block 606). The emergency service 114 also generates the emergency contacts list based on the hub member who is associated with the mobile phone.

At block 610, the emergency contacts list that includes emergency contacts designated for the hub members is displayed. For example, the emergency contacts list 420 is displayed on the integrated display device 402 of the mobile device 400 and the emergency contacts list includes the emergency contacts 412 (e.g., a subset of shared hub member contacts) that are designated for the hub members who are associated in the hub. The emergency contacts are displayed as selectable controls in the emergency contacts list 420 for user selection to initiate a phone call to a selected emergency contact.

Figure 7:
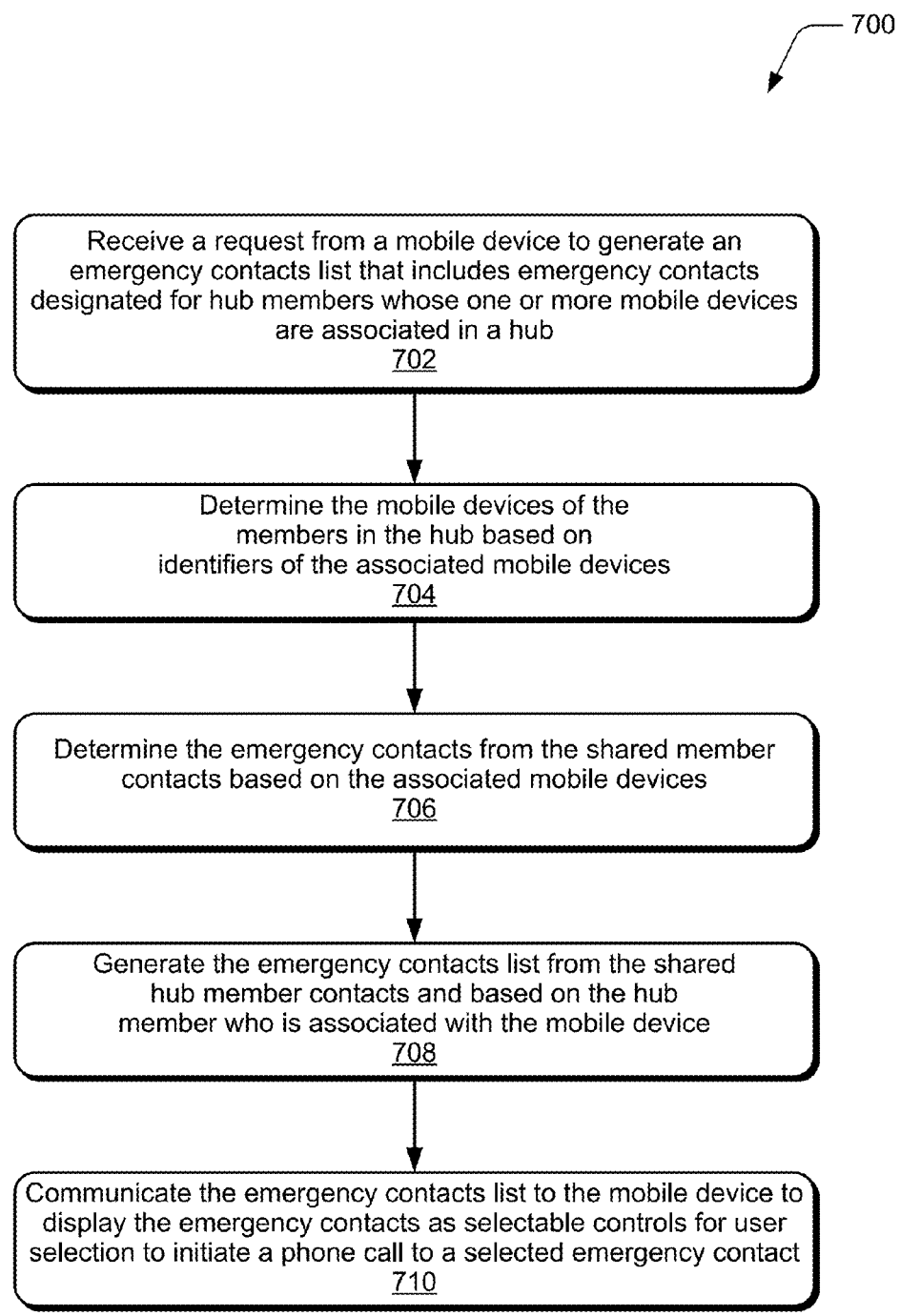
FIG. 7 illustrates example techniques of mobile device emergency calls in accordance with one or more embodiments.

FIG. 7 illustrates example procedure(s) 700 of mobile device emergency calls. The order in which the procedure blocks are described are not intended to be construed as a limitation, and any number of the described procedure blocks can be combined in any order to implement a procedure, or an alternate procedure.

At block 702, a request is received from a mobile device to generate an emergency contacts list that includes emergency contacts designated for hub members whose one or more mobile devices are associated in a hub. For example, the emergency service 114 implemented as part of the platform 1132 (FIG. 11) receive a request from a mobile device (e.g., mobile device 1102) to generate an emergency contacts list that includes emergency contacts designated for the hub members whose mobile devices are associated in the hub 200 (shown in FIG. 2). A request received from a mobile device may also include an indicator that functions of the mobile device are locked.

At block 704, the mobile devices of the hub members in the hub are determined based on identifiers of the associated mobile devices. For example, the emergency service 114 (which may be one of the services 1134 at the platform 1132) determines the associated devices, such as the mobile device 1132, based on the associated devices identifiers 114. The emergency service 114 manages a hub as a private, shared space of the associated hub members, and coordinates the shared hub information, such as the shared hub member contacts and the designated emergency contacts.

At block 706, the emergency contacts are determined from the shared hub member contacts based on the associated mobile devices. For example, the emergency service 114 at the platform 1132 determines the emergency contacts from the shared hub member contacts based on the associated mobile devices. At block 708, the emergency contacts list is generated from the shared hub member contacts and based on the hub member who is associated with the mobile device. For example, the emergency service 114 at the platform 1132 generates the emergency contacts list of the emergency contacts from the shared hub member contacts and based on the hub member who is associated with the mobile device (e.g., mobile device 1102).

At block 708, the emergency contacts list is communicated to the mobile device to display the emergency contacts as selectable controls for user selection to initiate a phone call to a selected emergency contact. For example, the emergency service 114 at the platform 1132 initiates communication of the emergency contacts list from the platform to the mobile device to display the emergency contacts as selectable controls for user selection to initiate a phone call to a selected emergency contact. Further, a phone call to a selected emergency contact can be initiated without the mobile device being unlocked if the features of the device are locked or restricted.

Implementation Example

Figure 8:
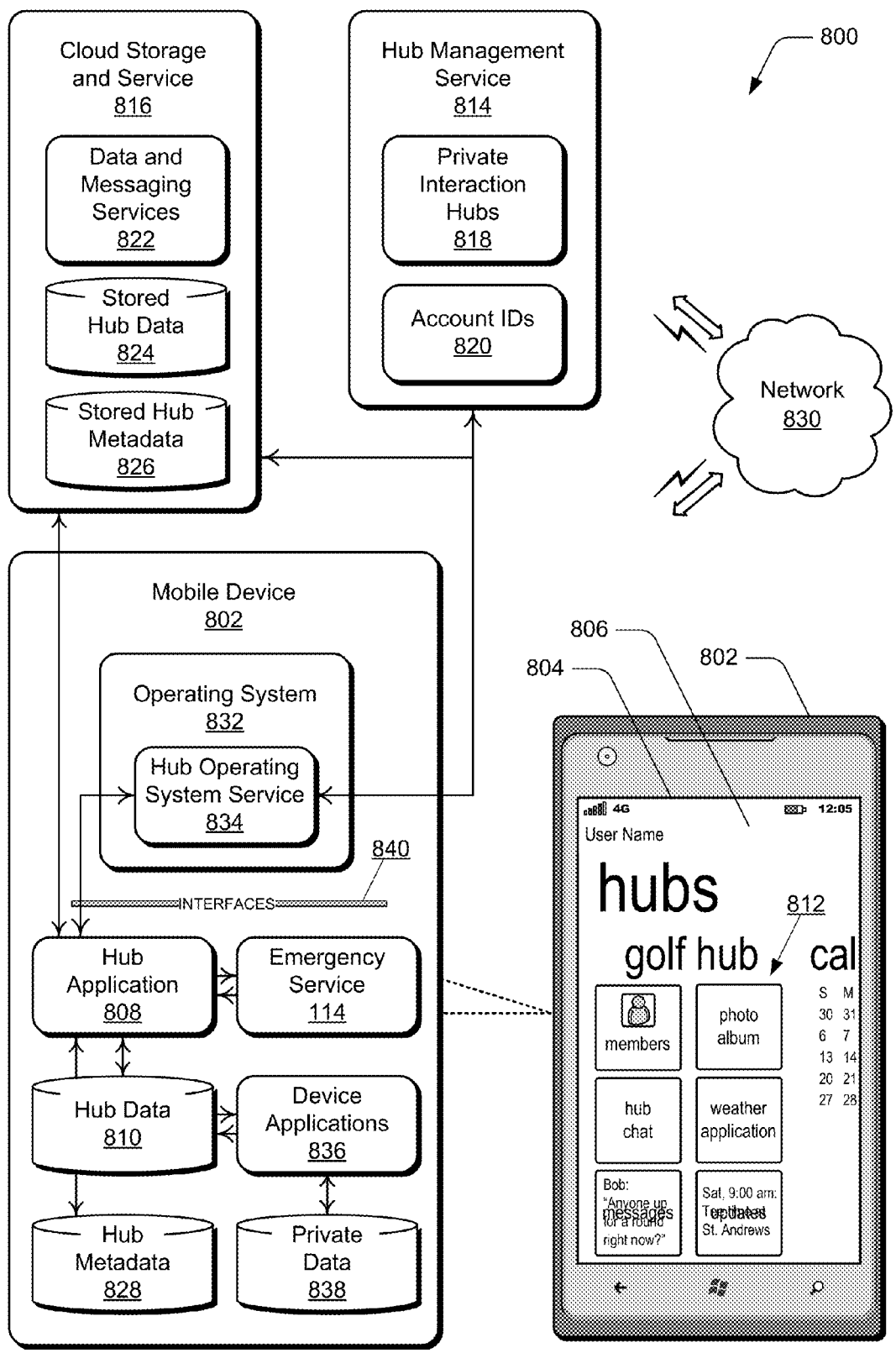
FIG. 8 illustrates an example system in which embodiments of hubs can be implemented.

FIG. 8 illustrates an example system 800 in which embodiments of private interaction hubs can be implemented. The system 800 includes an example mobile device 802, which may be any one or combination of a wired or wireless device, such as a mobile phone, tablet, computing, communication, entertainment, gaming, media playback, and/or other type of device. Any of the devices can be implemented with various components, such as a processing system and memory, as well as any number and combination of differing components as further described with reference to the example device shown in FIG. 11. As such, the mobile device 802 may implement techniques previously described in whole in or part, such as the techniques described with reference to the emergency service 114.

The mobile device 802 includes an integrated display device 804 on which user interfaces can be displayed, such as a hub user interface 806 of a hub application 808. The hub user interface offers a unified interactive view of the hub data 810 for a single, private interaction hub and the hub application 808 aggregates disparate types of the hub data 810 originating from the various member users of the private interaction hub. For example, the hub user interface may provide a single unified access point to shared hub messages, status updates, check-ins, hub calendar events, hub media, hub applications, and other types of hub content. As described above, a private interaction hub (or simply "hub") is a private network or association of member users who voluntarily elect to privately interact and collaborate with each other in a bi-directional manner. The hub data 810 includes any shared data or metadata that is used to facilitate the interaction and collaboration between the members of a private interaction hub, and may include shared data for messaging, notes, contact management, documents, tasks, location updates, photos, calendar events, applications (to include collaborative gaming applications), and/or other media content, such as any type of audio, music, video, and/or image data that may be available or accessed from any source.

The basic functionality of an example private interaction hub is shown as a golf hub displayed in the hub user interface 806 of the hub application 808. For example, the hub user interface can include various selectable user interface tiles 812, such as a members tile that is selectable to initiate a display of the constituent members of the private interaction hub. The user interface tiles 812 may also include hub chat and/or messages tiles to allow a hub member to participate in shared messaging threads with the other member users of the hub. For example, as shown, the member "Bob" has asked "Anyone up for a round right now?" The user interface tiles 812 may also include a photo album tile that is selectable to view photos shared by any of the hub members with the hub, and a shared notebook tile from which the hub members can view shared notes. For example, the golf hub may include a shared notes document that compiles the hub members' collective research of new golf equipment. The hub user interface 806 may also display a shared calendar that allows a member of the hub to view, edit, and post calendar events that will be shared with all of the other hub members. For example, the calendar tile shows an upcoming tee time at St. Andrews on Saturday at 9:00 a.m. for all of the members. When a user selects a group item (e.g., the message from Bob) or tile (e.g., the messaging tile), further details about the selected item or group items related to the selected tile may be displayed by the hub application itself or the hub application may call a different device application 836 (e.g., a messaging application) to display further details about the item(s).

When a user selects or otherwise engages with a piece of displayed hub data, such as the golf message from Bob, the hub application may provide additional details or options to the user to permit the user to interact further with the hub data. For example, the hub application may display controls to allow the user to edit or reply to Bob's message. Alternatively or in addition, when a user selects or otherwise engages with a piece of displayed hub data (e.g., Bob's message), the hub application may launch or call another device application to permit the user to further interact with the piece of hub data (e.g., the hub application may call a native messaging application).

The hub user interface 806 of the hub application 808 can also include user-selectable access to third-party applications, such as when an application is "pinned" to, or otherwise shared with a private interaction hub. A pinned third-party application may also utilize the shared hub data, such as shared application preferences or shared application state data. For example, the golf hub shown displayed in the hub user interface 806 includes a live tile representing a third-party weather application that the members of the hub can quickly access to check the weather forecast at their local golf club, such as when planning an upcoming golf outing. A user of the mobile device 802 can also customize display aspects of a hub user interface, such as the content of the user interface and how the elements of the hub user interface are arranged. Another example of a hub user interface of the hub application 808 is a panoramic hub user interface, such as for a family-centric private interaction hub as shown and described in greater detail with reference to FIG. 2.

The example system 800 also includes a hub management service 814, and a cloud storage and service 816. The hub management service 814 manages the formation and maintenance of private interaction hubs 818. The hub management service can correlate or associate member users of a hub by associating account identifiers 820 of the members with one or more of the private interaction hubs. The account identifier 820 of a member user may be associated with an identifier of a private interaction hub 818 in a data table that the hub management service maintains to correlate the hub members with one or more of the private interaction hubs. The hub management service 814 may also associate devices that correspond to hub members based on device identifiers. The account identifiers 820 can include user membership identifiers and/or sign-on credentials, such as an email and password combination, or a username and password combination. The sign-on credentials may be single sign-on ("SSO") credentials that are utilized for authentication purposes at a number of Web services, including the cloud storage and service 816.

The cloud storage and service 816 can include any type of cloud-based (e.g., network-based) data and messaging services 822. The messaging services may include any type of email, text (e.g., SMS, MMS), and/or instant messaging services. The data services may include any type of calendar, photo album, file or document sharing, location, mapping, music sharing, video sharing, gaming, contacts management, and/or notebook services, as well as any other type of services that can be used to share stored hub data 824. The stored hub data can include any form of messages, updates, events, content, media, and information that is maintained for the private interaction hubs 818, and is accessible from the mobile device 802, either upon a request from a device and/or upon a data "push" to the device. The cloud storage and service 816 also maintains stored hub metadata 826 that includes settings and information pertaining to the private interaction hubs 818, such as the name of a hub, the background image or photo of the hub, and an association of the hub members.

Although shown together as data and messaging services 822, various application data services and various messaging services may be operated on separate devices and/or operated by separate, distinct entities. Additionally, although the hub management service 814 and the cloud storage and service 816 are shown as independent services, they may be implemented together as a single service. Further, a server device (or group of server devices) can include implementations of both the hub management service 814 and the cloud storage and service 816, representative of a single entity that may be the same server system, company system, domain, and the like.

The cloud storage and service 816, and its constituent data and messaging services 822, interchange the stored hub data 824 and the stored hub metadata 826 between the mobile devices that are associated with member users of a private interaction hub 818. For example, a data and/or messaging service of the cloud storage and service 816 can receive a copy of hub data 810 and/or hub metadata 828 from the mobile device 802 that is used by a hub member, store this hub data and hub metadata in the cloud storage as the respective stored hub data 824 and stored hub metadata 826, and then distribute the stored hub data and stored hub metadata to other mobile devices associated with other member users of the same private interaction hub, as well as to other mobile devices associated with the same hub member. The stored hub metadata 826 can include membership information pertaining to the member users of a private interaction hub, hub identifiers that correlate a piece of hub data to a particular private interaction hub, user identifiers that correlate a piece of hub data to a particular member user, modification dates, and/or other metadata.

The cloud storage and service 816, and its constituent data and messaging services 822, may utilize single sign-on ("SSO") credentials for authentication purposes to limit the dissemination of the stored hub data 824 and the stored hub metadata 826 to only the authorized devices of hub members. Additionally, any of the devices and services (e.g., implemented as server devices) described herein can communicate via a network 830, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized, such as multiple devices connected using a peer-to-peer communication network.

The mobile device 802 includes an operating system 832 of the device, and the operating system includes a hub operating system service 834 that is implemented to integrate cloud-based services, a hub application 808, and local device applications 836 with the operating system to implement aspects of the private interaction hubs 818. The aspects that may be implemented include hub formation and membership maintenance, synchronizing the hub data 810 on the mobile device with the stored hub data 824, and the hub metadata 828 with the stored hub metadata 826, with the cloud storage and service 816, and providing the hub application 808 and the local device applications 836 on the mobile device 802 with access to the hub data 810 and the hub metadata 828. For example, the hub operating system service 834 may directly access the stored hub metadata 826 at the cloud storage and service 816.

The hub operating system service 834 (or alternatively, the hub application 808) may also determine and maintain a local copy of the membership associations of member users account identifiers 820 and identifiers of the private interaction hubs. The hub operating system service 834 may also synchronize the stored hub data 824 from the cloud storage and service 816 with the hub data 810 at the mobile device 802, and synchronize the stored hub metadata 826 from the cloud storage and service with the hub metadata 828 at the mobile device. The hub operating system service 834 may also synchronize with the cloud storage and service 816 (e.g., by sending changes or additions to hub data 810 and hub metadata 828 to the cloud storage and service 816). Such data synchronizations may occur in response to a user launching the hub application.

The mobile device 802 includes the device applications 836 that permit a user of the mobile device to access, create, and/or modify the hub data 810, private data 838 of the user, as well as the stored hub data 824 that is managed by any of the data and messaging services 822 at the cloud storage and service 816. Some or all of the device applications 836 may be implemented as client-side components or modules of any of the data and messaging services 822, or may be implemented as standalone, native applications (e.g., local device applications) at the mobile device. The device applications 836 typically each consume and provide access to only a portion or subset of the hub data 810 and the private data 838, such as only a single type of hub data and private data (e.g., only messaging data, but not calendar data). The device applications also typically present the consumed hub data to a user in conjunction with the private data 838. Private data is data or metadata that is not associated with a private interaction hub and that has not been shared with other members of the hub (e.g., data that has not been shared via the cloud storage and service 816).

The device applications 836 at the mobile device 802 may include a native or third-party messaging application that provides a user with messaging alerts and access to messaging threads. The messaging application provides access to both shared message threads shared with a private interaction hub and private message threads between a user of the mobile device and others who are not members of the hub. The messaging application also allows a user to send a message to all of the hub members without accessing a hub user interface of the hub application. The messaging application may not provide user access to other types of the hub data 810, other than the hub messages. For example, the messaging application may not provide access to the shared calendar events or shared photo albums of the hub.

The device applications 836 may also include a native or third-party calendaring application that provides scheduling alerts and access to a visual calendar. The calendaring application provides user access to both shared calendar events that are shared with hub members, and private calendar events (e.g., Exchange calendar events) that have not been shared with other members of the hub. The calendaring application also allows a user to create and/or share a calendar event to all members of the hub without accessing a hub user interface of the hub application. The application may not provide user access to other types of the hub data 810, other than the hub calendar events. For example, the calendaring application may not provide access to the shared message threads or shared photo albums of the hub.

The device applications 836 may also include a native or third-party media viewing and/or editing application that provides access to photo albums of digital photos or other digital media. The media application provides user access to both shared media files (e.g., photos, videos, and/or music) shared with a private interaction hub, and private media files that have not been shared with other members of the hub. The media application also allows a user to share media files with all members of the hub without accessing a hub user interface of the hub application. The media application may not provide user access to other types of hub data 810, other than hub media files. For example, the media application may not provide access to the shared message threads or shared calendar events of the hub.

The hub operating system service 834 can expose one or more Application Programming Interfaces ("APIs"), application binary interfaces, and/or other types of interfaces 840 to the hub application 808 and to the device applications 836 on the mobile device 802 to allow these applications to access, generate, and/or modify the hub data 810 and/or the hub metadata 828, as described herein. The hub operating system service 834 can be implemented as an integrated software component or module of the operating system 832. The hub operating system service can be maintained at the mobile device 802 as executable instructions that are stored on computer-readable storage media, such as any suitable memory device or electronic data storage as described with reference to the example device shown in FIG. 11. Additionally, the hub operating system service can be executed with a processing system at the mobile device to implement aspects of private interaction hubs.

In embodiments, the hub operating system service 834 can initiate the hub management service 814 to provision a private interaction hub 818. A user of the mobile device 802 can start a private interaction hub 818 and also invite others to join an existing private interaction hub. For example, the hub user interface 806 of the hub application 808 may provide an existing hub member with the option to add a new member to the hub, and the user may identify the prospective member by providing either a mobile device number, or by selecting an existing contact from one of their social networks or other contacts.

The hub operating system service 834 can receive the request from an existing member user of the device and, in response, the hub operating system service 834 and/or the hub management service 814 communicates an invitation to join the hub as an SMS, MMS, or instant message sent to the prospective member's mobile device that may include a link to a registration site or other registration instructions. The hub operating system service 834 and/or the hub management service 814 receives (e.g., via a registration website) an acceptance to the invitation to join the private interaction hub that includes at least an account identifier (such as an SSO credential), and associates the new member with the existing hub at the hub management service 814. Updated membership information, including the new member's account identifier 820 may also be propagated to other mobile devices of other members in the private interaction hub from the hub management service 814. When the new member user joins the hub, he or she may be prompted to download and/or install various applications configured to provide access to the stored hub data 824 and the stored hub metadata 826, such as the hub application 808 and/or the any of the device applications 836. The hub application 808 may also be the entry point by which a user creates a new hub and/or modifies the membership of an existing hub.

A private interaction hub 818 can be provisioned for any association of people, such as family members, coworkers, friends, neighbors, and any other people that may be associated together in a hub. Additionally, a member user of one private interaction hub may also be a member of multiple hubs, which can be based on a single member sign-on that identifies the member to the hub operating system service 834 and/or to the hub management service 814. For example, a person may be a member of a family hub that associates members of the person's family, as well as a member of a neighborhood hub that associates members of the person's neighborhood, and a golf hub that associates the person's friends that often golf together.

The integration of the hub application 808 with the operating system 832 of the mobile device provides that a user of the device can view a message or update on the hub user interface 806 and in an application user interface of an application that is associated with the message or the update. For example, a hub calendar is integrated with the calendar application (e.g., a device application 836) on the mobile device 802, and a calendar update that is displayed in the hub user interface 806 can be selected by the user to initiate the update being displayed in a calendar user interface of the calendar application. Alternatively, the user may view the calendar user interface and select a calendar event that is associated with a private interaction hub to initiate a display of the hub calendar, which includes the calendar event for the members of the hub. As another example, a hub calendar event can be displayed in a hub user interface, and the device calendar application can access and display the hub calendar event along with any private data calendar events that only the user of the device has access to view in a user interface of the device calendar application. The hub application 808 and the device application 836 both acquire the same hub calendar event data (e.g., the same hub data 810 stored on the mobile device). The two different user interfaces (e.g., a hub user interface and a device application user interface) display the same calendar event data.

In another example, the hub messages and chat features are integrated with messaging applications (e.g., the device applications 836) on the mobile device 802, and an email, text, or instant message that is displayed in the hub user interface 806 can be selected by the user of the mobile device 802 to initiate the message being displayed in a messaging application user interface. Alternatively, the user may view a recent message from a member of a private interaction hub in a messaging application user interface, and select the message to initiate a display of the hub messages interface, such as to view the discussion thread associated with the recent message.

In embodiments, the hub operating system service 834 at the mobile device 802 can receive social network updates for the member users of a private interaction hub 818, such as when two or more of the members of a hub are also "friends" on a public social network site, such as (e.g., FACEBOOK®, TWITTER®, or LINKEDIN®). The social network updates can be pulled from a social network site based on the established association of the account identifiers 820 of the hub members of a private interaction hub 818 at the hub management service 814. The hub operating system service 834 can then aggregate the social network updates for a particular hub for display in the hub user interface 806 or on a homepage "live tile" associated with the hub. The hub operating system service 834 at the mobile device 802 can also be implemented to coordinate multi-user interactive updates to an event that is managed in a private interaction hub. For example, several members of a hub may participate in a multi-player interactive game, and each successive interactive update from a member of the hub is initiated by the member at a respective associated mobile device.

Figure 9:
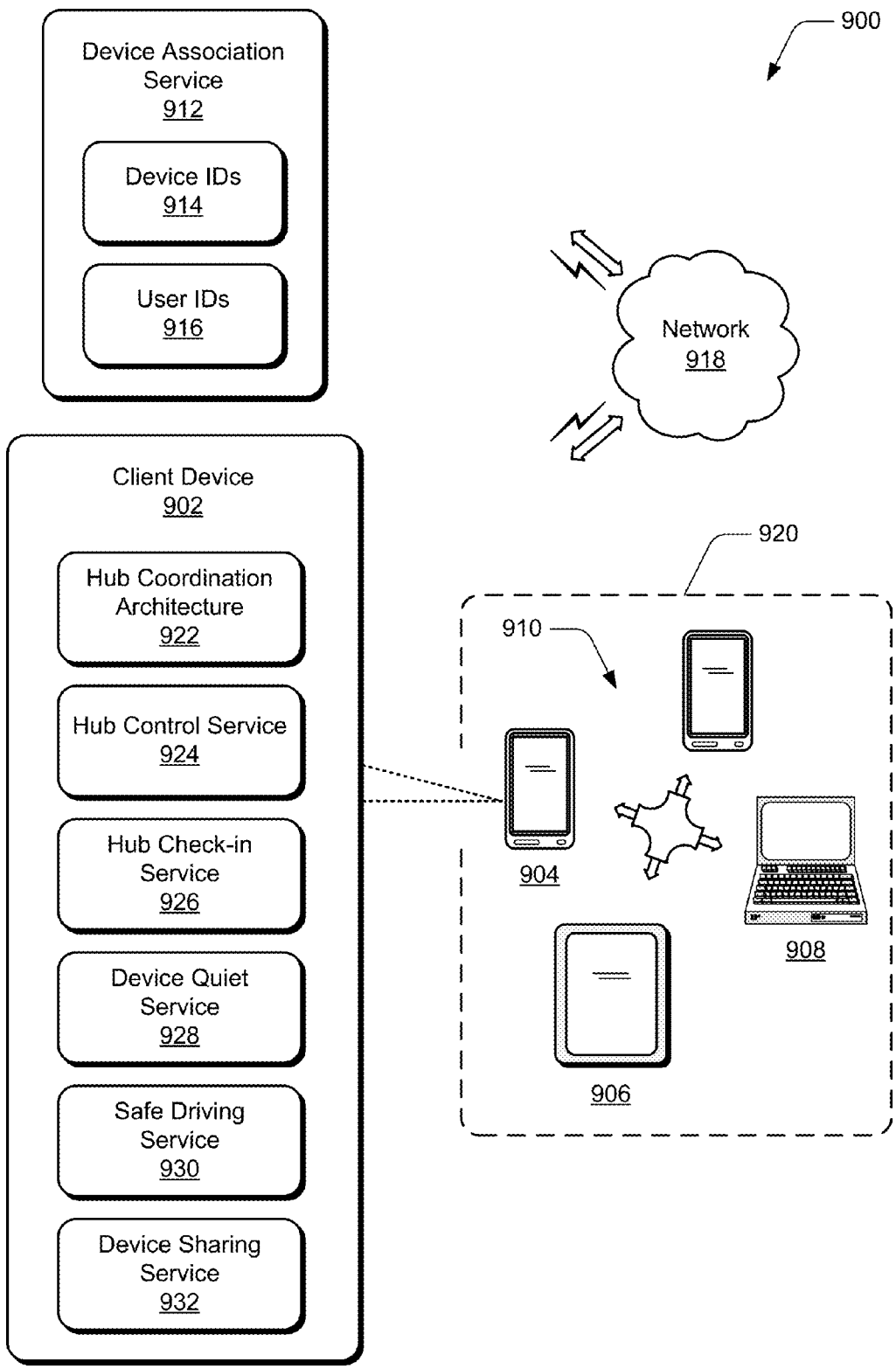
FIG. 9 illustrates another example system in which various embodiments of the previously described techniques can be implemented.

FIG. 9 illustrates an example system 900 in which various embodiments of the previously described techniques can be implemented. The example system includes a client device 902, which may be any one or combination of a mobile phone 904, tablet device 906, computing device 908, communication, entertainment, gaming, navigation, and/or other type of portable electronic device as previously described. Any of the client devices 910 can be implemented with various components, such as a processor and/or memory system, as well as any number and combination of differing components as further described with reference to the example device shown in FIG. 11 to implement embodiments of the techniques described herein.

The example system 900 includes a device association service 912 that associates or correlates the client devices 910 by device identifiers 914, user identifiers 916, and/or by any other type of identifiable association. Any of the devices and services can communicate via a network 918, which can be implemented to include wired and/or wireless networks. The network can also be implemented using any type of network topology and/or communication protocol, and can be represented or otherwise implemented as a combination of two or more networks, to include IP-based networks and/or the Internet. The network may also include mobile operator networks that are managed by mobile operators, such as a communication service provider, cell-phone provider, and/or Internet service provider. A mobile operator can facilitate mobile data and/or voice communication for any type of a wireless device or mobile phone.

The client devices 910 can each be associated with a different user, and the users are defined members of a hub 920. The example client device 902 is representative of the various client devices 910 in the hub. Any of the client devices in the family can include services, such as software applications (e.g., computer-executable instructions), that can be executed by a processor or processor system to implement the embodiments described herein. In this example, the client device 902 includes a hub coordination architecture 922 that implements features of a hub; a hub control service 924 that implements features of a hub dashboard; a hub check-in service 926; a device quiet service 928 that implements features of quiet time and quiet zone; a safe driving service 930; and a device sharing service 932.

Additionally, any one or combination of the various client device services may be abstracted for implementation by a network service provider, such as the device association service 912. For example, the client devices 910 that are associated in the hub 920 can be interconnected through a central computing device or system (e.g., may be one of the client devices 910), which may be local to the multiple devices or may be located remotely from the devices. In embodiments, the central computing device may be a cloud service of one or more server computers that are connected to the multiple devices via the communication network 918 or other communication link. The interconnection architecture enables functionality across multiple devices to provide a common and seamless experience to a user of the multiple devices. Each of the client devices may have different physical configurations and capabilities, and the central computing device implements a platform to enable delivery of an experience that is both tailored to a particular device and yet common to all of the devices.

Figure 10:
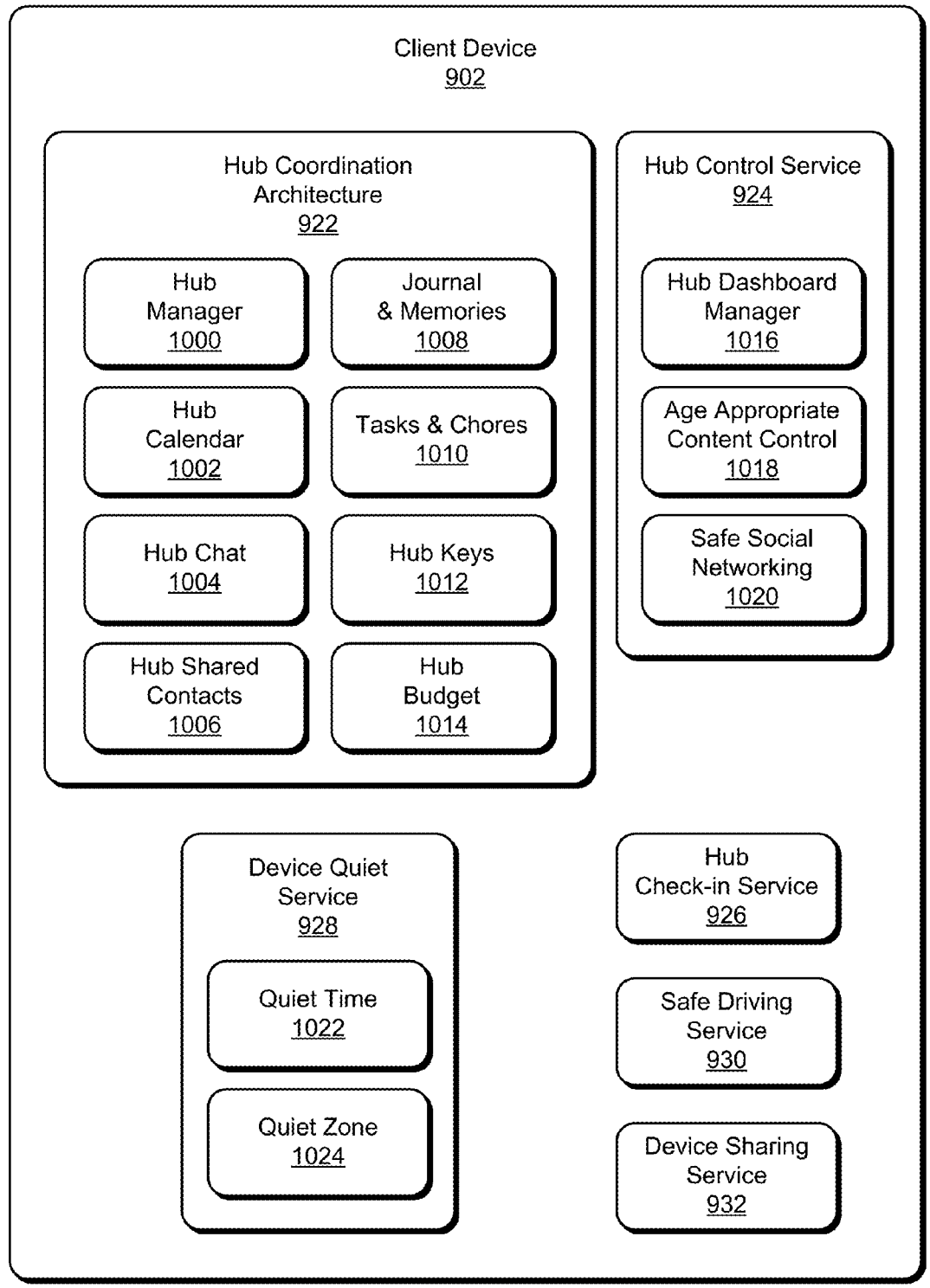
FIG. 10 further illustrates the various client device services that are described with reference to the previous sections.

FIG. 10 further illustrates the various client device services that are described with reference to the previous sections. The client device 1002 includes the hub coordination architecture 922, the hub control service 924, the hub check-in service 926, the device quiet service 928, the safe driving service 930, and the device sharing service 932. In embodiments, the hub coordination architecture 922 may generally be implemented as a service, as described herein. Generally, any of the described services may be implemented and/or described in the general context of software, firmware, hardware (e.g., fixed logic circuitry), manual processing, applications, routines, programs, objects, components, data structures, procedures, modules, functions, or any combination thereof. A software implementation represents program code that performs specified tasks when executed by a computer processor. In embodiments, any of the processing, computation, filtering, code execution, etc. can be implemented with distributed computing services and/or devices, such as on a client device, a server device, and/or network-based service.

In this example of the client device services, the hub coordination architecture 922 includes a hub manager 200 that implements, coordinates, and/or manages various hub features, such as hub calendar 1002, hub chat 1004, hub shared contacts 1006, hub journal and memories 1008, tasks and chores 1010, hub keys 1012, and hub budget 1014. The hub control service 924 implements features such as a hub dashboard manager 1016, age appropriate content control 1018, and safe social networking 1020. The device quiet service 928 implements features such as quiet time 1022 and quiet zone 1024. The various client device services and features are further described throughout the document.

Any of the client device services can include, be integrated with, or implement any of the other client device services and applications. For example, the hub coordination architecture 922 can include any one or combination of the hub control service 924, the hub check-in service 926, the device quiet service 928, the safe driving service 930, and the device sharing service 932. In embodiments, the hub coordination architecture 922 may be implemented for the coordination of time, messaging, data, activities, and any other shared services. The shared services may be any of the client device services and/or any type of shared services that may be associated with a service and/or multi-system operator (MSO) devices. Further, the hub control service 924 can be implemented to throttle, expand, manage, and/or reallocate data sharing of the client device services. Any of the hub features and/or applications of the hub coordination architecture can be implemented as private, some private and some public, or private with optional user control to share information and data with public third-party services and applications. Similarly, any of the client device services and applications described herein may be private, public, sharable, user-controllable, and/or any combination thereof.

Figure 11:
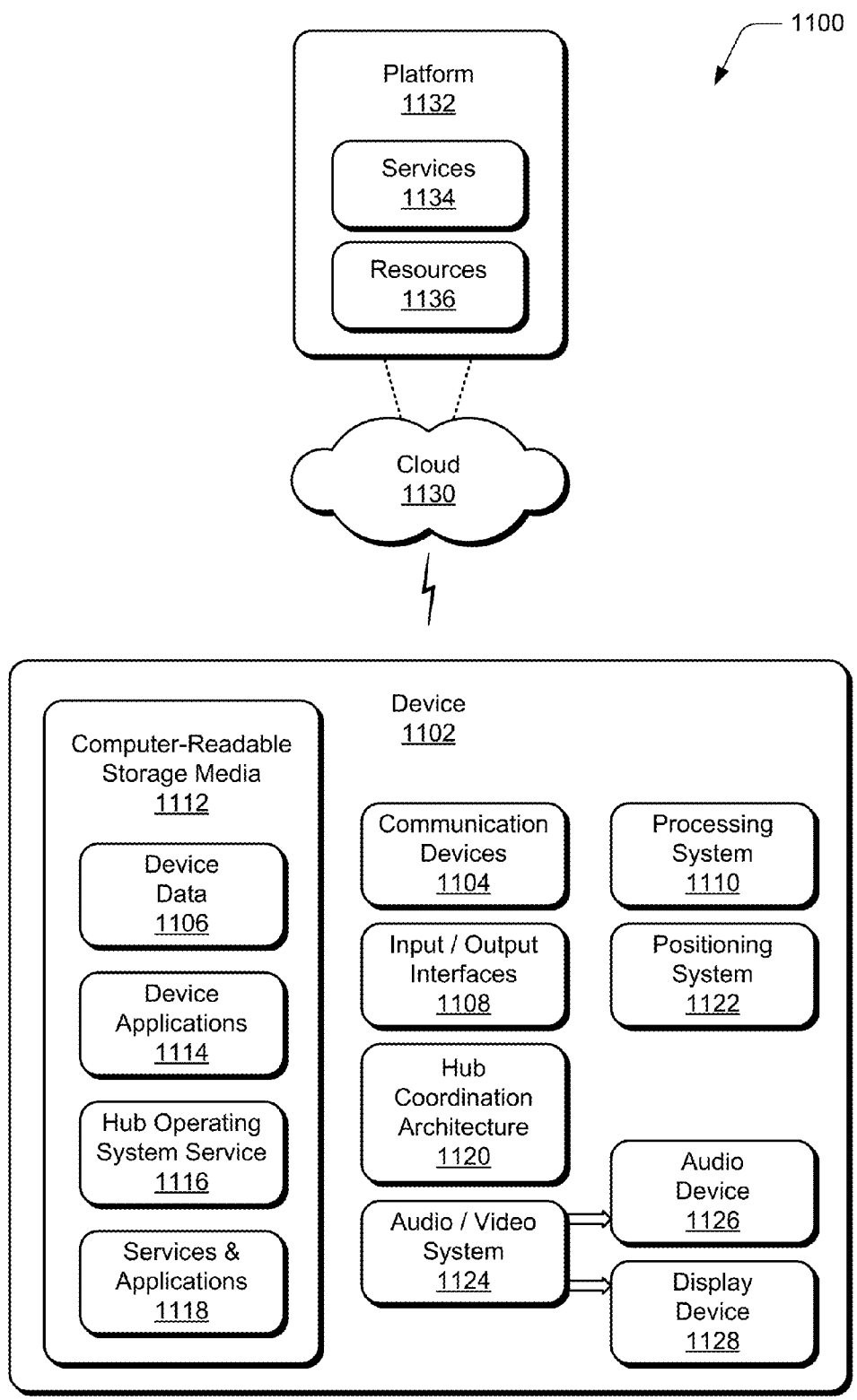
FIG. 11 illustrates an example system that includes an example device, which can implement embodiments of private interaction hubs.

FIG. 11 illustrates an example system 1100 that includes an example device 1102, which can implement embodiments of private interaction hubs. The example device 1102 can be implemented as any of the devices, services, and/or servers previously described, such as any type of client or mobile device (e.g., mobile phone, tablet, computing, communication, entertainment, gaming, media playback, and/or other type of device). For example, the mobile device 802, emergency service 114, and/or cloud service may be implemented as the example device 1102.

The device 1102 includes communication devices 1104 that enable wired and/or wireless communication of device data 1106, such as media content and the shared messages, updates, and events data at the device. The media content can include any type of audio, video, and/or image data. The communication devices 1104 can also include transceivers for cellular phone communication and/or for network data communication.

The device 1102 also includes input/output (I/O) interfaces 1108, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The I/O interfaces 1108 also support natural user interface (NUI) inputs to the device 1102, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 1102 includes a processing system 1110 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1102 may further include any type of a system bus or other data and command transfer system that couples the various components within the device. A system bus can include any one or combination of different bus structures and architectures, as well as control and data lines.

The device 1102 also includes computer-readable storage media 1112, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 1112 provides storage of the device data 1106 and various device applications 1114, such as an operating system that is maintained as a software application with the computer-readable storage media and executed by the processing system 1110. In this example, the device applications also include an hub operating system service 1116 that implements embodiments of private interaction hubs, such as when the example device 1102 is implemented as the client device 802 shown in FIG. 8. An example of the hub operating system service 1116 is the hub operating system service 824 that is integrated with the operating system 822 at the mobile device 802, as described with reference to FIG. 8.

The device applications 1114 can also include any of the hub services and applications 1118 that implement embodiments of private interaction hubs and/or mobile devices family coordination, such as described with reference to FIGS. 8-10. The example device 1102 also includes a hub coordination architecture 1120, which may be implemented in the general context of software, firmware, hardware (e.g., fixed logic circuitry), or any combination thereof to support embodiments of private interaction hubs and/or mobile devices family coordination. The device 1102 can also include a positioning system 1122, such as a GPS transceiver, or similar positioning system components, that can be utilized to determine a global or navigational position of the device.

The device 1102 also includes an audio and/or video system 1124 that generates audio data for an audio device 1126 and/or generates display data for a display device 1128. The audio device and/or the display device include any devices that process, display, and/or otherwise render audio, video, display, and/or image data. In implementations, the audio device and/or the display device are integrated components of the example device 1102. Alternatively, the audio device and/or the display device are external, peripheral components to the example device.

In embodiments, at least part of the techniques described for private interaction hubs may be implemented in a distributed system, such as over a "cloud" 1130 in a platform 1132. The cloud 1130 includes and/or is representative of the platform 1132 for services 1134 and/or resources 1136. For example, the services 1134 may include the hub management service 808 and the cloud service and storage 810 as described with reference to FIG. 8. Additionally, the resources 1136 may include any of the messaging applications and the collaborative applications as described previously.

The platform 1132 abstracts underlying functionality of hardware, such as server devices (e.g., included in the services 1134) and/or software resources (e.g., included as the resources 1136), and connects the example device 1102 with other devices, servers, etc. The resources 1136 may also include applications and/or data that can be utilized while computer processing is executed on servers that are remote from the example device 1102. Additionally, the services 1134 and/or the resources 1136 may facilitate subscriber network services, such as over the Internet, a cellular network, or Wi-Fi network. The platform 1132 may also serve to abstract and scale resources to service a demand for the resources 1136 that are implemented via the platform, such as in an interconnected device embodiment with functionality distributed throughout the system 1100. For example, the functionality may be implemented in part at the example device 1102 as well as via the platform 1132 that abstracts the functionality of the cloud 1130.

Although embodiments of mobile device emergency calls have been described in language specific to features and/or methods, the appended claims are not necessarily limited to the specific features or methods described. Rather, the specific features and methods are disclosed as example implementations of mobile device emergency calls.

The invention claimed is:

1. A computer-readable storage medium storing computer-executable instructions for execution on a device to perform operations to implement an emergency service, the operations comprising:
provinding the emergency service, wherein the emergency service is configured to manage a hub that is a private, shared space of members, the hub including shared contacts associated with the members of the hub;
receiving one or more inputs usable to form an emergency contacts list that includes a plurality of emergency contacts;
generating the emergency contacts list by:
identifying the members of the hub;
for each of the members of the hub, adding the member's emergency contacts, from the member's shared contacts, to the emergency contacts list;
receiving a request from a second device to generate a modified emergency contacts list, wherein the emergency contacts list contains a contact for a user associated with the second device;
responsive to receiving the request, generating the modified emergency contacts list by modifying the emergency contacts list based on the user associated with the second device, comprising:
removing the contact for the user associated with the second device from the emergency contact list; and
causing the modified emergency contacts list to be communicated to the second device.

2. A computer-readable storage medium as recited in claim 1, wherein the emergency contacts are designated as a subset of the shared member contacts.

3. A computer-readable storage medium as recited in claim 1, wherein the emergency service is configured to generate the emergency contacts list from shared member contacts responsive to input of an emergency contacts selectable control.

4. A computer-readable storage medium as recited in claim 1, wherein the generating is performable responsive to user selection from one or more other devices to initiate display of the emergency contacts list from a lock screen without unlocking the functions of the device.

5. A computer-readable storage medium as recited in claim 4, wherein the lock screen includes one or more of the emergency contacts displayed for user selection to initiate a phone call to a selected emergency contact.

6. A computer-readable storage medium as recited in claim 1, wherein the emergency contacts are displayable as selectable controls in the emergency contacts list in the user interface and are configured for user selection to initiate a phone call to a selected emergency contact.

7. A computer-readable storage medium as recited in claim 6, wherein each of the selectable controls are configured for the user selection to initiate the phone call to the selected emergency contact when functions of the device are locked.

8. A computer-readable storage medium as recited in claim 1, the operations further comprising:
generating a second modified emergency contacts list by modifying the emergency contacts list based on a user associated with a third device; and
causing the second modified emergency contacts list to be communicated to the third device.

9. A computer-readable storage medium as recited in claim 8, wherein the second modified emergency contacts list contains one or more emergency contacts that are not contained in the modified emergency contacts list.

10. A computer-readable storage medium as recited in claim 1, wherein the contacts list is communicated to one or more other devices for use in generating a message to be communicated automatically and without user intervention to the emergency contacts in the emergency contacts list responsive to a trigger.

11. A computer-readable storage medium as recited in claim 10, wherein the trigger is a phone call and the message is not a phone call.

12. A computer-readable storage medium as recited in claim 10, wherein trigger is formed using a biomedical sensor.

13. A computer-readable storage medium as recited in claim 10, wherein trigger is formed using a positional sensor.

14. A system comprising:
one or more processors;
one or more memory components comprising stored computer executable instructions which, when executed, perform operations comprising:
providing the emergency service, wherein the emergency service is configured to manage a hub that is a private, shared space of members, the hub including shared contacts associated with the members of the hub;
receiving one or more inputs usable to form an emergency contacts list that includes a plurality of emergency contacts;
generating the emergency contacts list by:
identifying the members of the hub;
for each of the members of the hub, adding the member's emergency contacts, from the member's shared contacts, to the emergency contacts list;
receiving a request from a second device to generate a modified emergency contacts list, wherein the emergency contacts list contains a contact for a user associated with the second device;
responsive to receiving the request, generating the modified emergency contacts list by modifying the emergency contacts list based on the user associated with the second device, comprising:
removing the contact for the user associated with the second device from the emergency contact list; and
causing the emergency contacts list to be communicated to the second client device.

15. The system of claim 14, the operations further comprising:
generating a second modified emergency contacts list by modifying the emergency contacts list based on a user associated with a third device, wherein the second modified emergency contacts list contains one or more emergency contacts that are not contained in the modified emergency contacts list; and
causing the second modified emergency contacts list to be communicated to the third device.

16. A method, comprising:
providing an emergency service, wherein the emergency service is configured to manage a hub that is a private, shared space of members, the hub including shared contacts associated with the members of the hub;
receiving one or more inputs usable to form an emergency contacts list that includes a plurality of emergency contacts;
generating the emergency contacts list by:
identifying the members of the hub;
for each of the members of the hub, adding the member's emergency contacts, from the member's shared contacts, to the emergency contacts list;
receiving a request from a device to generate a modified emergency contacts list wherein the emergency contacts list contains a contact for a user associated with the device;
responsive to receiving the request, generating the modified emergency contacts list by modifying the emergency contacts list based on a user associated with the device comprising:
removing the contact for the user associated with the device from the emergency contact list; and
causing the emergency contacts list to be communicated to the device.

17. The method of claim 16, further comprising:
generating a second modified emergency contacts list by modifying the emergency contacts list based on a user associated with a second device, wherein the second modified emergency contacts list contains one or more emergency contacts that are not contained in the modified emergency contacts list; and
causing the second modified emergency contacts list to be communicated to the second device.

* * * * *